United States Patent
Kozaki et al.

(10) Patent No.: US 7,584,681 B2
(45) Date of Patent: Sep. 8, 2009

(54) AUTOMATIC TRANSMISSION CONTROL SYSTEM

(75) Inventors: Tetsuji Kozaki, Aichi-ken (JP); Takaji Murakawa, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/216,746

(22) Filed: Jul. 10, 2008

(65) Prior Publication Data
US 2008/0276738 A1 Nov. 13, 2008

Related U.S. Application Data

(62) Division of application No. 11/008,652, filed on Dec. 10, 2004, now abandoned.

(30) Foreign Application Priority Data

| Dec. 10, 2003 | (JP) | ............................. 2003-412320 |
| Dec. 10, 2003 | (JP) | ............................. 2003-412321 |
| Jan. 30, 2004 | (JP) | ............................. 2004-024932 |

(51) Int. Cl.
F16H 59/00 (2006.01)
(52) U.S. Cl. ....................................................... 74/335
(58) Field of Classification Search ................. 477/906; 475/119, 132
See application file for complete search history.

(56) References Cited

U.S. PATENT DOCUMENTS

| 6,205,390 | B1 | 3/2001 | Holbrook et al. |
| 6,376,929 | B1 | 4/2002 | Nakajima |
| 6,432,015 | B1 * | 8/2002 | Takahashi ................... 475/116 |
| 6,835,152 | B2 * | 12/2004 | Itou et al. .................... 475/119 |
| 6,966,862 | B2 * | 11/2005 | Inuta ........................... 475/119 |
| 7,175,556 | B2 * | 2/2007 | Morise et al. ................ 475/119 |
| 7,285,071 | B2 * | 10/2007 | Nakajima et al. ........... 477/107 |
| 7,426,881 | B2 * | 9/2008 | Kozu et al. ................ 74/473.12 |

FOREIGN PATENT DOCUMENTS

| JP | 2000-179660 | 6/2000 |
| JP | 2003-294134 | 10/2003 |

OTHER PUBLICATIONS

Japanese Office Action dated Dec. 11, 2008, issued in corresponding Japanese Application No. 2003-412320, with English translation.
Chinese Office Action dated Apr. 28, 2007 issued in corresponding Chinese Application No. 200410100254.7 with English translation.
Official Action dated Oct. 1, 2008 issued in copending U.S. Appl. No. 11/008,652.

* cited by examiner

*Primary Examiner*—Dirk Wright
(74) *Attorney, Agent, or Firm*—Nixon & Vanderhye, PC

(57) ABSTRACT

An automatic transmission control system equipped with a shift lever position sensor which includes a plurality of switches which output binary signals following a shifting motion of a gear shift lever. Patterns of combinations of the switch outputs are preselected so as to represent positions to which the gear shift lever is manually shiftable. The switches are broken down into two groups each of which produces a binary code carrying information about the position of the gear shift lever to monitor a failure in operation of the shift lever position sensor. The control system also works to perform a deemed D-position hydraulic transmission control to ensure the running of the vehicle even if the shift lever position sensor is failing.

14 Claims, 23 Drawing Sheets

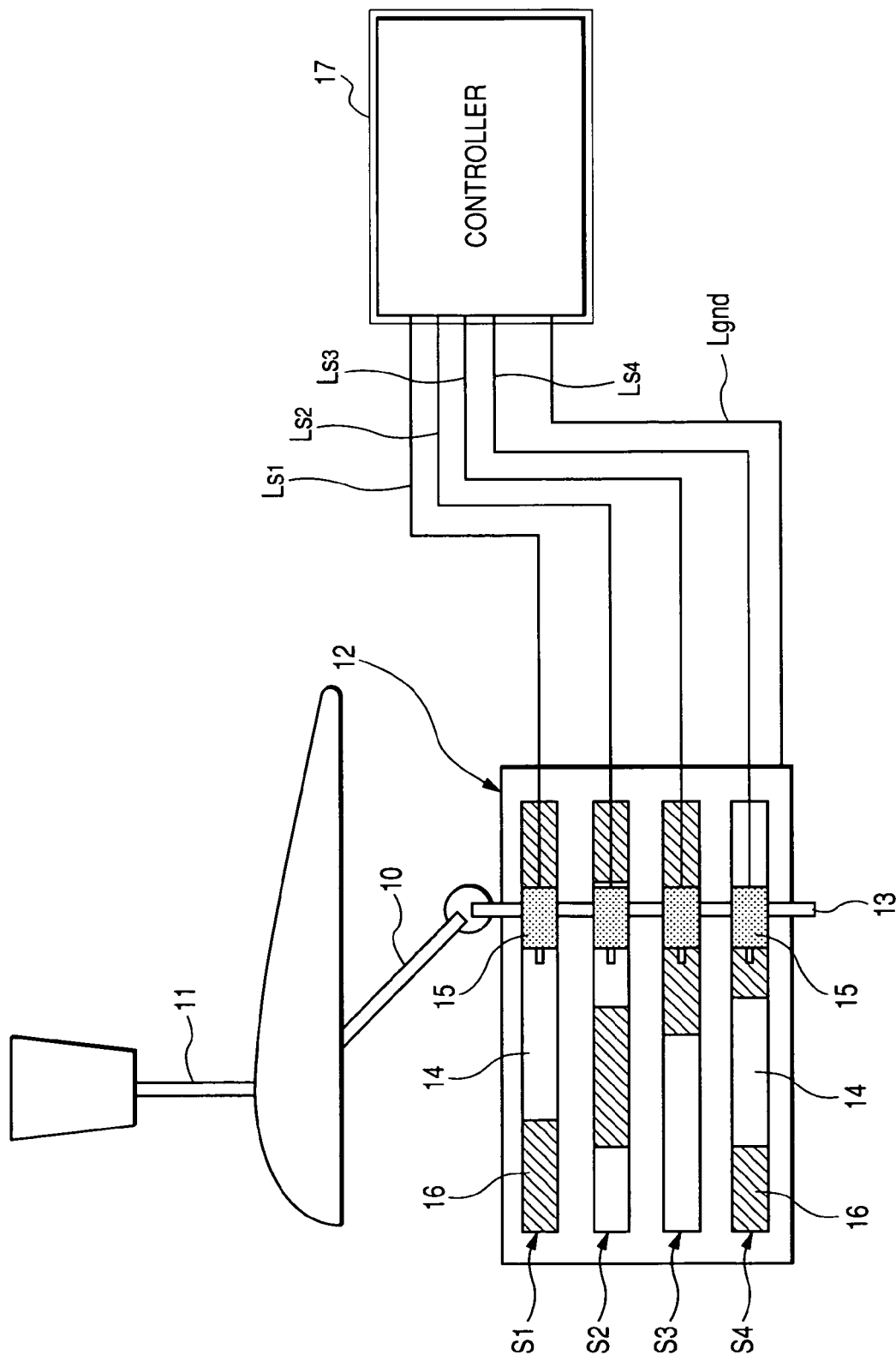

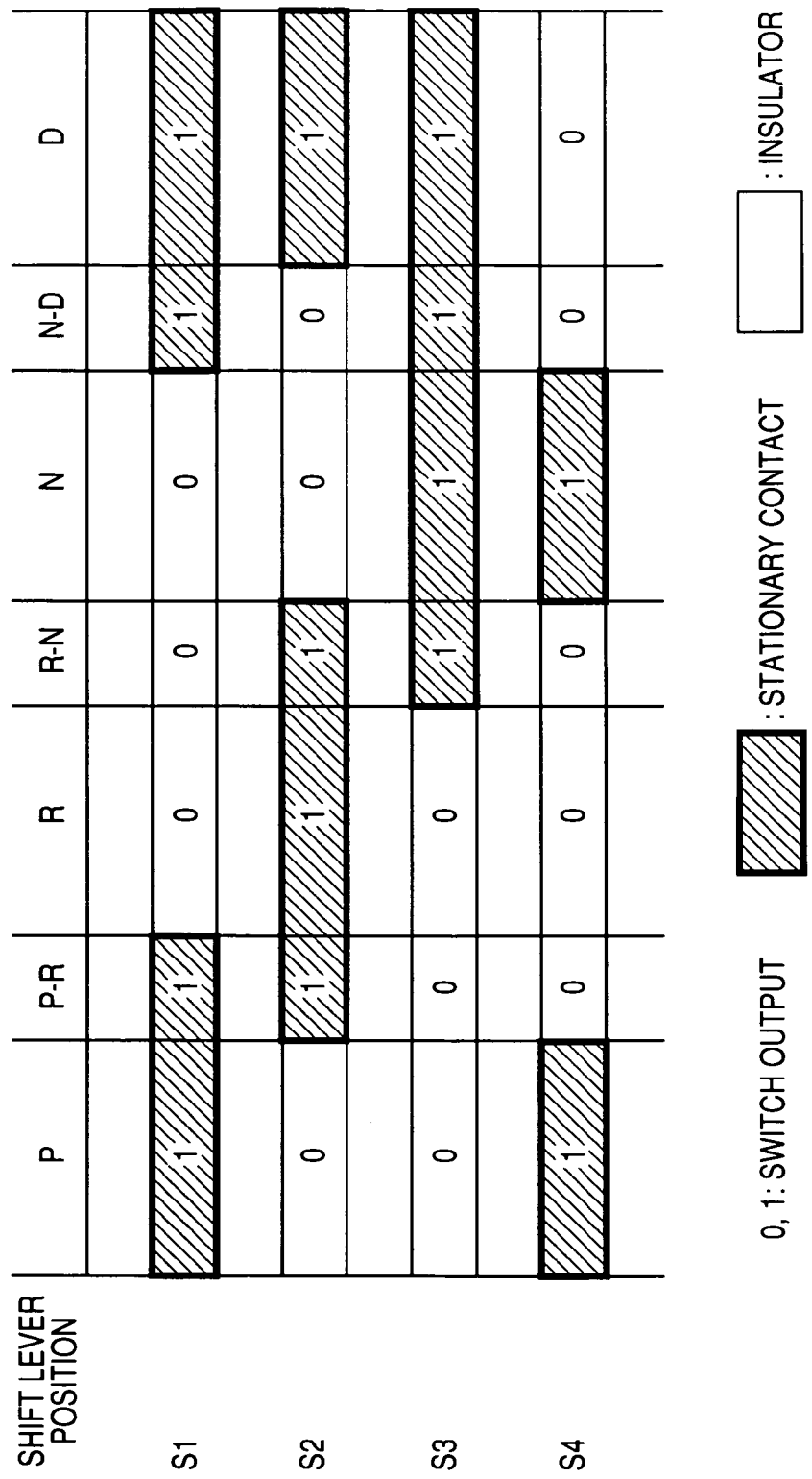

FIG. 3(a) NORMAL

|    | P | P-R | R | R-N | N | N-D | D |
|----|---|-----|---|-----|---|-----|---|
| S1 | 1 | 1   | 0 | 0   | 0 | 1   | 1 |
| S2 | 0 | 1   | 1 | 1   | 0 | 0   | 1 |
| S3 | 0 | 0   | 0 | 1   | 1 | 1   | 1 |
| S4 | 1 | 0   | 0 | 0   | 1 | 0   | 0 |

FIG. 3(b) S1 WIRE DISCONNECTION

|    | P | P-R | R | R-N | N | N-D | D |
|----|---|-----|---|-----|---|-----|---|
| S1 | 0 | 0   | 0 | 0   | 0 | 0   | 0 |
| S2 | 0 | 1   | 1 | 1   | 0 | 0   | 1 |
| S3 | 0 | 0   | 0 | 1   | 1 | 1   | 1 |
| S4 | 1 | 0   | 0 | 0   | 1 | 0   | 0 |
| DETERMINED POSITION | X(S) | R | R | R-N | N | N(I) | R-N |

FIG. 3(c) S2 WIRE DISCONNECTION

|    | P | P-R | R | R-N | N | N-D | D |
|----|---|-----|---|-----|---|-----|---|
| S1 | 1 | 1   | 0 | 0   | 0 | 1   | 1 |
| S2 | 0 | 0   | 0 | 0   | 0 | 0   | 0 |
| S3 | 0 | 0   | 0 | 1   | 1 | 1   | 1 |
| S4 | 1 | 0   | 0 | 0   | 1 | 0   | 0 |
| DETERMINED POSITION | P | P(I) | X(I) | N(I) | N | N-D | N-D |

FIG. 3(d) S3 WIRE DISCONNECTION

|    | P | P-R | R | R-N | N | N-D | D |
|----|---|-----|---|-----|---|-----|---|
| S1 | 1 | 1   | 0 | 0   | 0 | 1   | 1 |
| S2 | 0 | 1   | 1 | 1   | 0 | 0   | 1 |
| S3 | 0 | 0   | 0 | 0   | 0 | 0   | 0 |
| S4 | 1 | 0   | 0 | 0   | 1 | 0   | 0 |
| DETERMINED POSITION | P | P-R | R | R | X(S) | P(I) | P-R |

FIG. 3(e) S4 WIRE DISCONNECTION

|    | P | P-R | R | R-N | N | N-D | D |
|----|---|-----|---|-----|---|-----|---|
| S1 | 1 | 1   | 0 | 0   | 0 | 1   | 1 |
| S2 | 0 | 1   | 1 | 1   | 0 | 0   | 1 |
| S3 | 0 | 0   | 0 | 1   | 1 | 1   | 1 |
| S4 | 0 | 0   | 0 | 0   | 0 | 0   | 0 |
| DETERMINED POSITION | P(I) | P-R | R | R-N | N(I) | N-D | D |

FIG. 4(a)

NORMAL

|    | P | P-R | R | R-N | N | N-D | D |
|----|---|-----|---|-----|---|-----|---|
| S1 | 1 | 1   | 0 | 0   | 0 | 1   | 1 |
| S2 | 0 | 1   | 1 | 1   | 0 | 0   | 1 |
| S3 | 0 | 0   | 0 | 1   | 1 | 1   | 1 |
| S4 | 1 | 0   | 0 | 0   | 1 | 0   | 0 |

FIG. 4(b)

S1 SHORT

|    | P | P-R | R | R-N | N | N-D | D |
|----|---|-----|---|-----|---|-----|---|
| S1 | 1 | 1   | 1 | 1   | 1 | 1   | 1 |
| S2 | 0 | 1   | 1 | 1   | 0 | 0   | 1 |
| S3 | 0 | 0   | 0 | 1   | 1 | 1   | 1 |
| S4 | 1 | 0   | 0 | 0   | 1 | 0   | 0 |
| DETERMINED POSITION | P | P-R | P-R | D | N-D(S) | N-D | D |

FIG. 4(c)

S2 SHORT

|    | P | P-R | R | R-N | N | N-D | D |
|----|---|-----|---|-----|---|-----|---|
| S1 | 1 | 1   | 0 | 0   | 0 | 1   | 1 |
| S2 | 1 | 1   | 1 | 1   | 1 | 1   | 1 |
| S3 | 0 | 0   | 0 | 1   | 1 | 1   | 1 |
| S4 | 1 | 0   | 0 | 0   | 1 | 0   | 0 |
| DETERMINED POSITION | P-R(S) | P-R | R | R-N | R-N(S) | D | D |

FIG. 4(d)

S3 SHORT

|    | P | P-R | R | R-N | N | N-D | D |
|----|---|-----|---|-----|---|-----|---|
| S1 | 1 | 1   | 0 | 0   | 0 | 1   | 1 |
| S2 | 0 | 1   | 1 | 1   | 0 | 0   | 1 |
| S3 | 1 | 1   | 1 | 1   | 1 | 1   | 1 |
| S4 | 1 | 0   | 0 | 0   | 1 | 0   | 0 |
| DETERMINED POSITION | N-D(S) | D | R-N | R-N | N | N-D | D |

FIG. 4(e)

S4 SHORT

|    | P | P-R | R | R-N | N | N-D | D |
|----|---|-----|---|-----|---|-----|---|
| S1 | 1 | 1   | 0 | 0   | 0 | 1   | 1 |
| S2 | 0 | 1   | 1 | 1   | 0 | 0   | 1 |
| S3 | 0 | 0   | 0 | 1   | 1 | 1   | 1 |
| S4 | 1 | 1   | 1 | 1   | 1 | 1   | 1 |
| DETERMINED POSITION | P | P-R(S) | R(S) | R-N(S) | N | N-D(S) | D(S) |

FIG. 10

| RANGE | CLUTCH/BRAKE | C1 | B1 | C2 | C0 | B0 |
|---|---|---|---|---|---|---|
| R | | ○ | | | | ○ |
| P·N | | | | | | |
| D | 1ST SPEED | | | | ○ | ○ |
| D | 2ND SPEED | | ○ | | ○ | |
| D | 3RD SPEED | | | ○ | ○ | |
| D | 4TH SPEED | | ○ | ○ | | |

FIG. 13(a) NORMAL

|    | P | P-R | R | R-N | N | N-D | D |
|----|---|-----|---|-----|---|-----|---|
| S1 | 1 | 1   | 0 | 0   | 0 | 1   | 1 |
| S2 | 0 | 1   | 1 | 1   | 0 | 0   | 1 |
| S3 | 0 | 0   | 0 | 1   | 1 | 1   | 1 |

FIG. 13(b) S1 WIRE DISCONNECTION

|    | P | P-R | R | R-N | N | N-D | D |
|----|---|-----|---|-----|---|-----|---|
| S1 | 0 | 0   | 0 | 0   | 0 | 0   | 0 |
| S2 | 0 | 1   | 1 | 1   | 0 | 0   | 1 |
| S3 | 0 | 0   | 0 | 1   | 1 | 1   | 1 |
| DETERMINED POSITION | X | R | R | R-N | N | N | R-N |

FIG. 13(c) S2 WIRE DISCONNECTION

|    | P | P-R | R | R-N | N | N-D | D |
|----|---|-----|---|-----|---|-----|---|
| S1 | 1 | 1   | 0 | 0   | 0 | 1   | 1 |
| S2 | 0 | 0   | 0 | 0   | 0 | 0   | 0 |
| S3 | 0 | 0   | 0 | 1   | 1 | 1   | 1 |
| DETERMINED POSITION | P | P | X | N | N | N-D | N-D |

FIG. 13(d) S3 WIRE DISCONNECTION

|    | P | P-R | R | R-N | N | N-D | D |
|----|---|-----|---|-----|---|-----|---|
| S1 | 1 | 1   | 0 | 0   | 0 | 1   | 1 |
| S2 | 0 | 1   | 1 | 1   | 0 | 0   | 1 |
| S3 | 0 | 0   | 0 | 0   | 0 | 0   | 0 |
| DETERMINED POSITION | P | P-R | R | R | X | P | P-R |

FIG. 14(a)

NORMAL

|  | P | P-R | R | R-N | N | N-D | D |
|---|---|---|---|---|---|---|---|
| S1 | 1 | 1 | 0 | 0 | 0 | 1 | 1 |
| S2 | 0 | 1 | 1 | 1 | 0 | 0 | 1 |
| S3 | 0 | 0 | 0 | 1 | 1 | 1 | 1 |

FIG. 14(b)

S1 SHORT

|  | P | P-R | R | R-N | N | N-D | D |
|---|---|---|---|---|---|---|---|
| S1 | 1 | 1 | 1 | 1 | 1 | 1 | 1 |
| S2 | 0 | 1 | 1 | 1 | 0 | 0 | 1 |
| S3 | 0 | 0 | 0 | 1 | 1 | 1 | 1 |
| DETERMINED POSITION | P | P-R | P-R | D | N-D | N-D | D |

FIG. 14(c)

S2 SHORT

|  | P | P-R | R | R-N | N | N-D | D |
|---|---|---|---|---|---|---|---|
| S1 | 1 | 1 | 0 | 0 | 0 | 1 | 1 |
| S2 | 1 | 1 | 1 | 1 | 1 | 1 | 1 |
| S3 | 0 | 0 | 0 | 1 | 1 | 1 | 1 |
| DETERMINED POSITION | P-R | P-R | R | R-N | R-N | D | D |

FIG. 14(d)

S3 SHORT

|  | P | P-R | R | R-N | N | N-D | D |
|---|---|---|---|---|---|---|---|
| S1 | 1 | 1 | 0 | 0 | 0 | 1 | 1 |
| S2 | 0 | 1 | 1 | 1 | 0 | 0 | 1 |
| S3 | 1 | 1 | 1 | 1 | 1 | 1 | 1 |
| DETERMINED POSITION | N-D | D | R-N | R-N | N | N-D | D |

AUTOMATIC TRANSMISSION CONTROL SYSTEM

CROSS REFERENCE TO RELATED DOCUMENT

This application is a division of application Ser. No. 11/008,652, filed Dec. 10, 2004, which is in turn based on Japanese Patent Application Nos. 2003-412320, 2003-412321, and 2004-24932 filed on Dec. 10, 2003, Dec. 10, 2003, and Jan. 30, 2004, the disclosures of which are incorporated herein by reference.

BACKGROUND OF THE INVENTION

1. Technical Field of the Invention

The present invention relates generally to an automatic transmission control system for automotive vehicles, and more particularly to such a system working to monitor a failure in operation of a shift lever position sensor and/or to ensure running of the vehicle if the shift lever position sensor is failing.

2. Background Art

Japanese Patent First Publication No. 2003-294134 discloses a shift lever position sensor implemented by an inhibitor switch equipped with four contacts S1, S2, S3, and S4 which are turned on or off following the motion of a gear shift lever manually shifted by a vehicle driver. Patterns of combinations of the on- or off-states of the contacts S1 to S4 are designed to be different among a parking (a, a reverse (R), a neutral (N), and a drive (D) position of the gear shift lever. Specifically, each of the patterns represents one of the P, R, N, and D position of the gear shift lever.

The above type of inhibitor switch has the problem in that if a failure such as a wire disconnection or a short circuit occurs in any of the contacts S1 to S4, an error signal is outputted.

In order to avoid an error in determining the N and P positions of the gear shift lever arising from the failure of the inhibitor switch, the inhibitor switch, as taught in the above publication, is so designed that if any one of the contacts S1 to S4 outputs an error signal when the gear shift lever is placed in the N position, the pattern of combination of the on- and off-sates of the switches S1 to S4 in the N position does not match that in the P position and that it may be determined the inhibitor switch is failing when a pattern of a combination of outputs from the switches S1 to S4 does not match any of those as representing the P, R, N, and D position of the gear shift lever correctly.

The above type of inhibitor switch, however, has the drawback in that if a pattern of a combination of outputs of the switches S1 to S4 matches any one of those as representing the P, R, N, and D position of the gear shift lever correctly, a difficulty is encountered in determining the presence of the failure of the inhibitor switch, and the gear shift lever may be determined in error as being placed in a position other than the correct one. This may cause the gear shift lever to be determined in error to be placed in a position other than the D position, even though the gear shift lever is actually in the D position, thus resulting in the impossibility of operating the automatic transmission to run the vehicle.

SUMMARY OF THE INVENTION

It is therefore a principal object of the invention to avoid the disadvantages of the prior art.

It is another object of the invention to provide an automatic transmission shift lever position sensing apparatus and a shift lever position sensor designed to ensure the reliability in monitoring the position of a gear shift lever for automatic transmissions.

It is a further object of the invention to provide an automatic transmission control system designed to ensure the running of an automotive vehicle if a failure has occurred in operating of a shift lever position sensor.

According to one aspect of the invention, there is provided an automatic transmission shift lever position sensing apparatus which may be employed in automotive vehicles. The automatic transmission shift lever sensing apparatus comprises: (a) a lever position sensor including a plurality of sensing elements each of which produces a binary signal, each of the binary signals selectively having one of two binary values in response to a shifting motion of a gear shift lever of an automatic transmission, the sensing elements being broken down into a first and a second sensing element group, the first and second sensing element groups working to produce a first and a second binary code made up of the binary values, respectively, each of the first and second binary code carrying information about one of lever positions in which the gear shift lever is placed; (b) a position determining circuit which determines in which of the lever positions the gear shift lever is placed and/or determines whether the lever position sensor is failing or not based on the first and second binary codes produced by the first and second sensing element groups of the lever position sensor.

Specifically, use of the binary signals produced by the two sensing element groups results in improved accuracy of determining the position of the gear shift lever and increased detectable failures or improved detectionability of the shift lever position sensor.

In the preferred mode of the invention, the lever positions of the gear shift lever are a parking position, a reverse position, a neutral position, a drive position, and intermediate positions therebetween. The first sensing element group is made up of a given number of the sensing elements. The first binary code is formed by each of predetermined combinations of the binary signals produced by the first sensor element group which corresponds to one of the parking, reverse, neutral, drive, and intermediate positions. This enables all frequently-used positions of the gear shift lever that to be monitored.

Two of the combinations of the binary signals representing adjacent two of the parking, reverse, neutral, drive, and intermediate positions are designed to be different from each other in the binary value of the binary signal as produced by only one of the sensing elements. This avoids an error in determining the position of the gear shift lever if any one of a failure such as a wire disconnection or a short circuit has occurred in the sensing elements.

At least one of the sensing elements of the first sensing element group produces an active level signal as the binary signal thereof when the gear shift lever is placed in any of the parking, reverse, neutral, drive, and intermediate positions. Specifically, if all of the sensing elements of the first sensing element group are designed to produce a pattern of the inactive level signals when the gear shift lever is placed in any of the parking, reverse, neutral, drive, and intermediate positions, it may cause the same patterns to appear if a wire disconnection occurs in a ground line of the lever position sensor, thus leading to an error in determining the position of the gear shift lever, but the above structure in which any of bits of the binary signals has the active level eliminates such an error.

The sensing elements of the first sensing element group all produce the active level signals as the binary signals thereof when the gear shift lever is placed in the drive position. This prevents the gear shift lever from being determined in error to be in the reverse position when it is actually placed between the neutral and drive position, which causes back-up lamps of the vehicle to be turned on.

The first binary code is formed by each of predetermined combinations of the binary signals produced by the first sensor element group which corresponds to one of the parking, reverse, neutral, drive, and intermediate positions. The second sensing element group is made of one of the sensing elements. The second binary code is formed by the binary signal produced by the second sensing element group which has a first one of the binary values when the gear shift lever is placed in either of the parking and neutral positions and a second one of the binary values when the gear shift lever is placed in any of the lever positions other than the parking and neutral positions. The position determining circuit performs a determination of in which of the lever positions the gear shift lever is placed using the first binary code and determines whether the lever position sensor is failing or not using a result of the determination and the second binary code. This enables all frequently used positions of the gear shift lever to be monitored accurately and also results in an increase in failure that can be monitored.

The first sensing element group may be made up of three of the sensing elements two of which produce the active level signals as the binary signals thereof when the gear shift lever is placed in any of the intermediate positions. This is most suitable for monitoring the parking, reverse, neutral, drive, and intermediate positions of the gear shift lever.

Each time any one of the binary signals produced by the first sensing element group changes in the binary value, the position determining circuit performs an interruption operation to sample the binary signals outputted from the first sensing element group and also samples the binary signal outputted from the second sensing element group at a regular sampling cycle. This avoids an omission of detection of the position of the gear shift lever when shifted rapidly.

Each time any one of the binary signals produced by the first sensing element group changes in the binary value, the position determining circuit determines whether or not the lever position represented by a resulting combination of the binary signals produced by the first sensing element group is adjacent to that represented by a combination of the binary signals produced by the first sensing element group before the any one of the binary signals changes to determine whether the lever position sensor is failing or not. For example, when the wire disconnection has occurred in one of the sensing elements, and the gear shift lever has been moved from the parking to the reverse position through the intermediate position therebetween, the position determining circuit determines in error that the gear shift lever has been moved from the parking position directly to the reverse position. In this case, the position determining circuit omits the intermediate position. The failure of the sensing element, thus, detected by monitoring such an event.

According to the second aspect of the invention, there is provided a computer executable control program for controlling an automatic transmission shift lever position sensing apparatus equipped with a lever position sensor including a plurality of sensing elements each of which produces a binary signal. Each of the binary signals selectively has one of two binary values in response to a shifting motion of a gear shift lever of an automatic transmission. The sensing elements are broken down into a first and a second sensing element group. The control program includes a first task to be executed to sample the binary signals produced by the first and second sensing element groups to read therefrom a first and a second binary code carrying information about one of lever positions in which the gear shift lever is placed and a second task to be executed to determine in which of the lever positions the gear shift lever is placed and/or determine whether the lever position sensor is failing or not based on a combination of the first and second binary codes made of the binary signals produced by the first and second sensing element groups.

In the preferred mode of the invention, the lever positions of the gear shift lever are a parking position, a reverse position, a neutral position, a drive position, and positions intermediate therebetween. When the gear shift lever is placed in one of the parking, reverse, neutral, drive, and intermediate positions, the first sensing element group works to produce the first binary code made of one of predetermined combinations of the binary signals which represents the one of the parking, reverse, neutral, drive, and intermediate positions. The second sensing element group is made of one of the sensing elements. The sensing element of the second sensing element group works to produce the second binary code made of the binary signal which has a first one of the binary values when the gear shift lever is placed in either of the parking and neutral positions and a second one of the binary values when the gear shift lever is placed in any of the lever positions other than the parking and neutral positions. The second task is to perform a determination of in which of the lever positions the gear shift lever is placed using the first binary code produced by the first sensing element group and to determine whether the lever position sensor is failing or not using a result of the determination and the second binary code produced by the second sensing element group.

Each time any one of the binary signals produced by the first sensing element group changes in the binary value, the first task performs an interruption operation to sample the binary signals outputted from the first sensing element group and samples the binary signal outputted from the second sensing element group at a given sampling cycle.

Each time any one of the binary signals produced by the first sensing element group changes in the binary value, the second task works to determine whether or not the lever position represented by a resulting combination of the binary signals produced by the first sensing element group is adjacent to that represented by a combination of the binary signals produced by the first sensing element group before the any one of the binary signals changes to determine whether the lever position sensor is failing or not.

According to the third aspect of the invention, there is provided an automatic transmission shift lever sensor which comprises: (a) a plurality of sensing elements each of which produces a binary signal. Each of the binary signals selectively has one of two binary values in response to a shifting motion of a gear shift lever of an automatic transmission. The sensing elements are broken down into a first and a second sensing element group. The first and second sensing element groups work to produce a first and a second binary code made up of the binary values, respectively. Each of the first and second binary code carries information about one of lever positions in which the gear shift lever is placed.

The lever positions of the gear shift lever are a parking position, a reverse position, a neutral position, a drive position, and intermediate positions therebetween. The first sensing element group is made up of a given number of the sensing elements. The first binary code is provided by each of predetermined combinations of the binary signals produced by the first sensor element group which corresponds to one of the parking, reverse, neutral, drive, and intermediate positions.

Two of the combinations of the binary signals representing adjacent two of the parking, reverse, neutral, drive, and intermediate positions are different from each other in the binary value of the binary signal as produced by only one of the sensing elements.

At least one of the sensing elements of the first sensing element group produces an active level signal as the binary signal thereof when the gear shift lever is placed in any of the parking, reverse, neutral, drive, and intermediate positions.

The sensing elements of the first sensing element group all produce the active level signals as the binary signals thereof when the gear shift lever is placed in the drive position.

The first binary code is formed by each of predetermined combinations of the binary signals produced by the first sensor element group which corresponds to one of the parking, reverse, neutral, drive, and intermediate positions. The second sensing element group is made of one of the sensing elements. The second binary code is formed by the binary signal produced by the second sensing element group which has a first one of the binary values when the gear shift lever is placed in either of the parking and neutral positions and a second one of the binary values when the gear shift lever is placed in any of the lever positions other than the parking and neutral positions.

Two of the sensing elements of the first sensing element group produce the active level signals as the binary signals thereof when the gear shift lever is placed in any of the intermediate positions.

According to the fourth aspect of the invention, there is provided an automatic transmission control system which may be employed in automotive vehicles. The control system comprises: (a) a lever position sensor designed to produce signals each of which represents one of a parking position, a reverse position, a neutral position, and a drive position to which a gear shift lever is shifted manually by an operator; (b) a plurality of hydraulic control valves working to control hydraulic pressures to be supplied to frictional elements of an automatic transmission; (c) a manual selector valve which selectively establishes hydraulic supply circuits leading to the hydraulic control valves following a shifting motion of the gear shift lever, the manual selector valve working to establish predetermined ones of the hydraulic supply circuit to achieve a selected one of forward gears of the automatic transmission only when the gear shift lever is placed in the drive position; and (d) a gear change controller which monitors a position of the gear shift lever using the signal produced by the lever position sensor and operates the hydraulic control valves to hydraulically control engagement of the frictional elements of the automatic transmission to establish a selected one of gears of the automatic transmission. When the signal from the lever position sensor represents the position of the gear shift lever other than the drive position, and a predetermined condition is encountered, the gear change controller deems the gear shift lever to be placed in the drive position and performs a deemed D-position hydraulic transmission control to establish a given one of the forward gears of the automatic transmission.

Specifically, the deemed D-position hydraulic transmission control is initiated whenever the gear shift lever is determined to be in a position other than the drive position whether it is incorrect or correct. If the determination that the gear shift lever is placed in the position other than the drive position is correct, it means that the gear shift lever has been actually shifted to that position, so that the manual selector valve blocks the hydraulic supply line(s) to the hydraulic control valve(s) communicating with one(s) of the frictional elements required to establish the forward gear of the automatic transmission. Thus, execution of the deemed D-position hydraulic transmission control result in no establishment of the forward gear, so that the vehicle does not run forwardly. When the gear shift lever has been actually shifted to the drive position, the manual selector valve is placed in a position to achieve a drive range of the automatic transmission. Accordingly, even if the gear shift lever is determined in error to be in a position other than the drive position, execution of the deemed D-position hydraulic transmission control will result in establishment of the forward gear of the automatic transmission. Therefore, even if the lever position sensor has failed, so that it is impossible to detect the drive position of the gear shift lever, shifting the gear shift lever to the drive position enables the vehicle to run.

In the preferred mode of the invention, each of a given number of the signals produced by the lever position sensor carries a binary code made of a combination of a plurality of binary signals. Each of the binary codes represents one of the parking, reverse, neutral, and drive position, and intermediate positions therebetween to which the gear shift lever is shiftable. Two of the combinations of the binary signals represent adjacent two of the parking, reverse, neutral, drive, and intermediate positions are different from each other in a binary value of only one of the binary signals. This facilitates detection of a failure such as a wire disconnection or a short circuit occurring in any one of sensing elements of the lever position sensor.

At least one of the binary signals is designed to be in an active level signal when the gear shift lever is placed in any of the parking, reverse, neutral, drive, and intermediate positions. Specifically, if all of the sensing elements of the first sensing element group are designed to produce a pattern of the inactive level signals when the gear shift lever is placed in any of the parking, reverse, neutral, drive, and intermediate positions, it may cause the same patterns to appear if a wire disconnection occurs, thus leading to an error in determining the position of the gear shift lever, but the above structure in which any of bits of the binary signals has the active level eliminates such an error.

Each of a given number of the signals produced by the lever position sensor may carry a three-bit code made of a combination of a plurality of binary signals. Each of the three-bit codes represents one of the parking, reverse, neutral, and drive position, and intermediate positions therebetween to which the gear shift lever is shiftable and is so designed two of three bits of each of the three-bit codes have the active level as presenting the intermediate positions. This is most suitable for monitoring the parking, reverse, neutral, drive, and intermediate positions of the gear shift lever.

Each of the signals produced by the lever position sensor may carry a code made up of binary values. All of the binary values are designed to be active level values when the gear shift lever is placed in the drive position. This prevents the gear shift lever from being determined in error to be in the reverse position when it is actually placed between the neutral and drive position, which causes back-up lamps of the vehicle to be turned on.

A failure determining circuit may further be provided which works to monitor a failure in operation of the lever position sensor. Each of the signals produced by the lever position sensor carries a binary code made up of a combination of binary values. Each time any one of the binary codes changes in the binary value, the failure determining circuit determines whether or not the position of the gear shift lever represented by a resulting combination of the binary values is adjacent to that represented by a combination of the binary values group before the any one of the binary codes changes to determine whether the lever position sensor is failing in operation or not. This allows the failure of the lever position sensor to be detected by determining whether a pattern of the combination of the binary values monitored is a correct one or not.

The deemed D-position hydraulic transmission control is performed when the gear shift lever is monitored as being placed in an R-N position intermediate between the reverse and neutral positions. This ensures the running of the vehicle if the gear shift lever is shifted to the drive position, but it is determined in error to be placed in the R-N position.

The deemed D-position hydraulic transmission control may be performed when the gear shift lever is monitored as being kept in an N-D position intermediate between the neutral and drive positions for a given period of time.

When the lever position sensor is in a normal state, and the gear shift lever is monitored as having been shifted from the neutral to N-D position, the gear change controller usually must monitor a change from the N-D to drive position subsequently. Therefore, if the gear shift lever is still determined to be held in the N-D position after a lapse of a time which is typically considered to be consumed by a change in the position of the gear shift lever from the N-D to drive position, the gear change controller determines that the lever position sensor has failed, and initiates the deemed D-position hydraulic transmission control in the automatic transmission.

The deemed D-position hydraulic transmission control may be performed immediately when the gear shift lever is monitored as being shifted from the drive position to an N-D position intermediate between the drive and neutral positions. The deemed D-position hydraulic transmission control may be performed when the gear shift lever is monitored as being shifted from the neutral position to and kept in the N-D position for a given period of time. This ensures the running of the vehicle if the lever position sensor has failed, so that the gear shift lever is determined in error to be placed in the N-D position.

An input shaft speed sensor may further be provided which measures a speed of an input shaft of the automatic transmission and provides a signal indicative thereof. The gear change controller monitors a gear change action of the automatic transmission using the signal provided by the input shaft speed sensor during execution of the deemed D-position hydraulic transmission control to determine whether the lever position sensor is failing in operation or not.

The gear change controller may alternatively work to determine a gear ratio of the automatic transmission. The gear change controller monitors the gear change action of the automatic transmission using the determined gear ratio during execution of the deemed D-position hydraulic transmission control to determine whether the lever position sensor is failing in operation or not.

The change controller may alternatively work to determine the hydraulic pressures acting on the frictional elements of the automatic transmission. The gear change controller monitors a gear change action of the automatic transmission using the determined hydraulic pressures during execution of the deemed D-position hydraulic transmission control to determine whether the lever position sensor is failing in operation or not.

When it is determined that the lever position sensor is failing, the gear change controller may perform a fail-safe function to control the hydraulic control valves so as to establish a given gear in a drive range of the automatic transmission.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 1 is a view which shows an automatic transmission sensor system according to the first embodiment of the invention;

FIG. 2 is a diagram which shows patterns of combinations of on- and off-states of switches of a lever position sensor;

FIG. 3($a$) is a table which shows patterns of combinations of on- and -off states of switches of a lever position sensor when it is operating normally;

FIGS. 3($b$), 3($c$), 3($d$), and 3($e$) are tables which show patterns of combinations of on- and -off states of switches of a lever position sensor when wire disconnections have occurred in the switches, respectively;

FIG. 4($a$) is a table which shows patterns of combinations of on- and -off states of switches of a lever position sensor when it is operating normally;

FIGS. 4($b$), 4($c$), 4($d$), and 4($e$) are tables which show patterns of combinations of on- and -off states of switches of a lever position sensor when short circuits have occurred in the switches, respectively;

FIG. 10 is a table which shows operative relations among frictional elements and gear ranges of an automatic transmission;

FIG. 13($a$) is a table which shows patterns of combinations of on- and -off states of switches of a lever position sensor when it is operating normally;

FIGS. 13($b$), 13($c$), and 13($d$) are tables which show patterns of combinations of on- and -off states of switches of a lever position sensor when wire disconnections have occurred in the switches, respectively;

FIG. 14($a$) is a table which shows patterns of combinations of on- and -off states of switches of a lever position sensor when it is operating normally;

FIGS. 14($b$), 14($c$), and 14($d$) are tables which show patterns of combinations of on- and -off states of switches of a lever position sensor when short circuits have occurred in the switches, respectively;

DESCRIPTION OF THE PREFERRED EMBODIMENTS

Figure 5:
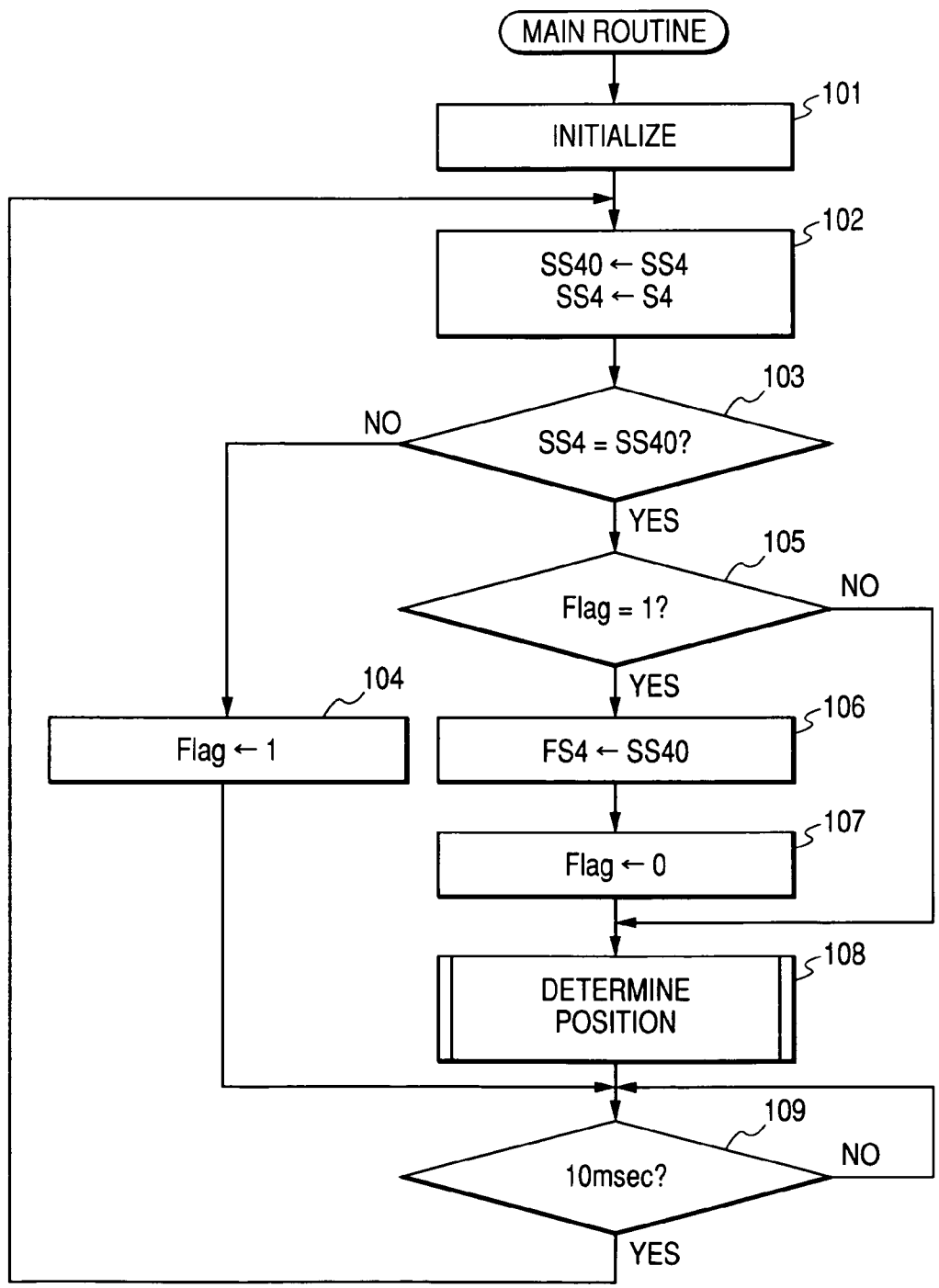
FIG. 5 is a flowchart of a main program to be executed by an automatic transmission sensor system of the first embodiment of the invention.

Referring to the drawings, wherein like reference numbers refer to like parts in several views, particularly to FIG. 1, there is shown an automatic transmission (AT) range sensor system according to the invention which may be employed in automotive vehicles. The AT range sensor system is designed to determine in which gear range an automatic transmission is. The AT range sensor system also works as a shift lever position sensing apparatus designed to sense the position of a gear shift lever 11 (also called a selector lever) for determining the gear range of the automatic transmission.

The automatic transmission, as referred to in this embodiment, has a typical structure such as one illustrated in FIGS. 8 and 9, as will be described later in detail. The automatic transmission is designed to be switchable in operation between four gear ranges: a parking (P) range, a reverse (R) range, a neutral (N) range, and a drive (D) range. Such switching is achieved by manually moving the gear shift lever 11.

The AT range sensor system includes a shift lever position sensor 12 and a controller 17. The shift lever position sensor 12 works to monitor the position of the gear shift lever 11. The shift lever position sensor 12 includes a slidable lever 13 joined to the gear shift lever 11 through a bar link 10.

The shift lever position sensor 12 also includes four switches S1, S2, S3, and S4 each of which is made up of an insulator 14, a movable contact 15, and a stationary contact 16. The movable contacts 15 are arrayed and attached to the slidable lever 13. The stationary contacts 16 are, as can be seen from the drawing, affixed to the insulators 14 at locations different from each other. The movable contacts 15 are electrically coupled with input ports of the controller 17 through signal lines Ls1, Ls2, Ls3, and Ls4, respectively. Each of the stationary contacts 16 is connected to a ground terminal of the controller 17 through a ground line Lgnd. When the gear shift lever 11 is manually pulled or pushed to change the P, R, N, and D ranges one to another, it will cause the slidable lever 13 to move to have the movable contacts 15 slide on the insulators 14, thereby making one or some of electrical connections between the movable contacts 15 and the stationary contacts 16 to produce a combination of high- or low-level signals (i.e., binary signals of 0 or 1) to the controller 17 through the signal lines Ls1, Ls2, Ls3, and Ls4 as indicating the position of the gear shift lever 11, which will also be referred to as a gear range signal below.

The controller 17 is made up of a CPU, a ROM, and a RAM, and an I/O interface circuit. When each of the movable contacts 15 makes an electrical connection with a corresponding one of the stationary contacts 16, it will produce the high-level signal, while when it makes no electrical connection, it will produce the low-level signal. The high- and low-level signals are inputted to the I/O interface circuit of the controller 17 and changed into a logic one (1) and a logic zero (0), respectively. The controller 17 works to analyze, as will be described later in detail, a combination of the logic signals to determine the position of the gear shift lever 11 and also determine whether the shift lever position sensor 12 is malfunctioning or not.

The structure of the shift lever position sensor 12 will be described below in detail with reference to FIGS. 1 to 4(e).

The automatic transmission, as referred to in this embodiment, is designed to change the gear ranges in a shift pattern of P-R-N-D. The shift lever position sensor 12 is designed to monitor a total of seven shift lever positions: a parking (P) position, a reverse (R) position, a neutral (N) position, a drive (D) position, a P-R position, an R-N position, and an N-D position. When the gear shift lever 11 is in the P, R, N, or D position, it means that the automatic transmission is placed in the P range, the R range, the N range, or the D range. The P-R position, the R-N position, and the N-D position are positions intermediate between the P and R positions, between the R and N positions, and between the N and D positions of the gear shift lever 12, respectively.

The seven shift lever positions, as described above, are each expressed by a three-bit code. The switches S1, S2, S3, and S4 are broken down into two groups: a first switch group made up of the three switches S1, S2, and S3, and a second switch group made up of the switch S4. The controller 17 uses combinations of the binary signals (i.e. the logic 1 or 0) outputted from the first switch groups (i.e., the switches S1, S2, and S3) to produce the three-bit codes as indicating the seven shift lever positions, as described above.

Generally, it is possible for a three-bit code to represent $2^3$=eight (8) binary patterns. Since the seven shift lever positions are to be represented by combinations of the output signals of the first switch group (i.e., the switches S1, S2, and S3), one of the eight binary patterns, as represented by the three-bit code, is not used in representing the position of the gear shift lever 11. Specifically, one of the binary patterns which is made up only of inactive signals (i.e., the logic zero (0) signals) outputted from the switches S1, S2, and S3 is used for detecting a wire breakage occurring in the ground line Lgnd of the shift lever position sensor 12. The remaining binary patterns each including an active signal (i.e., the logic one (1) signal) outputted from at least one of the switches S1, S2, and S3 are used as indicating the position of the gear shift lever 11.

In order to avoid an error in determining the position of the shift lever 11 which arises from matching between one of the four binary patterns indicating the P, R, N, and D positions and another one if a failure such as wire breakage or short circuit occurs in the shift lever position sensor 12, the controller 17 is constructed to represent the seven shift lever positions, as described above, using Gray codes. Specifically, the switches S1, S2, and S3 are so designed that the output of only one of the switches S1, S2, and S3 changes in the logic level upon shifting of the gear shift lever 11 from one of the seven positions: the P position, the R position, the N position, the D position, the P-R position, the R-N position, and the N-D position to an adjacent one.

Specifically, the seven binary patterns are broken down into three first types in which only one bit of the three-bit code is logic 1, three second types in which two bits of the three-bit code are logic 1, and one third type in which all bits of the three-bit code are logic 1. According to definitions of the Gray code, the second type binary codes in which two of three bits are logic 1 are used as indicating the intermediate shift lever positions (i.e., the P-R position, the R-N position, and the N-D position). Consequently, the P, R, N, and D positions of the gear shift lever 11 are expressed by three binary patterns (i.e., the first type binary codes) in which only one bit is logic 1 and one binary pattern (i.e., the third type binary code) in which all three bits are logic 1. If the P and N positions are expressed by the third type binary code in which all three bits are logic 1, it will make it impossible to detect the short circuit in each of the switches S1, S2, and S3 only when the gear shift lever 11 is in any one of the intermediate shift lever positions (i.e., the P-R position, the R-N position, and the N-D position), thus resulting in a decrease in the binary patterns useful for monitoring the failure in operation of the shift lever position sensor 12. Alternatively, if the R position is expressed by the third type binary code, it will result in an error in which the N-D position is determined as the R position, thereby causing back-up lamps of the vehicle to be turned on in error. From these points of view, the third type binary code in which all three bits are logic 1 is preferably used to represent the D position of the gear shift lever 11.

The second switch group, that is, the switch S4 is used to detect the P or N position of the gear shift lever 11 which permits the starter to crank the engine. Specifically, the switch S4 is designed to produce a binary signal in the P or N position which is clearly different in pattern from those in the other positions. In this embodiment, the switch S4 produces, as shown in FIG. 3(*a*), a logic 1 in the P or N position and a logic 0 in the other positions, but however, may be designed to produce binary signals to the contrary.

Specifically, in the manner as described above, combinations of logic signals, as listed in FIG. 3(*a*), are assigned to the switches S1, S2, S3, and S4 as indicating the seven positions of the gear shift lever 11 to be monitored by the shift lever position sensor 12. The stationary contacts 16 of the switches S1, S2, S3, and S4 are affixed to the insulators 14 at locations, as indicated by hatched areas in FIG. 2, where they make electric connections with the movable contacts 15 to produce the binary signal of 1.

The three-bit codes formed by combinations of the outputs of the first switch group (i.e., the switches S1, S2, and S3) are "100" in the P position, "110" in the P-R position, "010" in the R position, "011" in the R-N position, "001" in the N position, "101" in the N-D position, and "111" in the D position.

The binary patterns upon a failure in operation of the shift lever position sensor 12 will be analyzed with reference to FIGS. 3(*a*) to 4(*e*).

The failure of the shift lever position sensor 12, as referred to herein as an example, is a wire disconnection or a short circuit occurring in at least one of the switches S1, S2, S3, and S4. In FIGS. 3(*b*) to 3(*e*) and FIGS. 4(*b*) to 4(*e*), the last line indicates results of decision by the controller 17 based on the outputs of the first switch groups (i.e., the switches S1, S2, and S3). "X" represents the case where the outputs of the first switch group are all logic 0. The subscript "S" denotes the binary pattern which allows the engine to be cranked, that is, in which the output of the switch S4 is logic 1. The subscript "I" denotes the binary pattern which inhibits the engine from being cranked, that is, in which the output of the switch S4 is logic 0.

Wire Disconnection in Switch S1

When the wire disconnection has occurred in the switch S1 of the first switch group, the output of the switch S1, as shown in FIG. 3(*b*), will be logic 0 in each of all the shift lever positions. For example, when the gear shift lever 11 is in the P position, a combination of the outputs of the first group switch (i.e., the switches S1, S2, and S3) will be "000", while the output of the second switch group (i.e., the switch S4) will be "1" which permits the engine to be cranked. The controller 17, thus, determines that the switch S1 has failed and allows the engine to start up.

When the gear shift lever 11 is in the P-R position, a combination of the outputs of the first group switch will be "010". This will cause the controller 17 to determine in error that the gear shift lever 11 is in the R position. The manner of detecting the failure in this case will be described later in detail.

When the gear shift lever 11 is in the N-D position, a combination of the outputs of the first group switch will be "001" that is the same as indicating the N position, while the output of the second switch group will be "0" which inhibits the engine from being cranked. The controller 17 determines that the switch S1 has failed and inhibits the engine from starting up.

When the gear shift lever 11 is in the D position, a combination of the outputs of the first group switch will be "011" that is the same as indicating the N-R position. This causes the controller 17 to determine in error that the gear shift lever 11 is in the R-N position.

Wire Disconnection in Switch S2

When the wire disconnection has occurred in the switch S2 of the first switch group, the output of the switch S2, as shown in FIG. 3(*c*), will be logic 0 in each of all the shift lever positions. For example, when the gear shift lever 11 is in the P-R position, a combination of the outputs of the first group switch (i.e., the switches S1, S2, and S3) will be "100" that is the same as indicating the position P, while the output of the second switch group (i.e., the switch S4) will be "0" which inhibits the engine from being cranked. The controller 17 determines that the switch S2 has failed and inhibits the engine from starting up.

When the gear shift lever 11 is in the R position, a combination of the outputs of the first group switch will be "000", and the output of the second switch group will be "0". The controller 17 determines that the switch S2 has failed and inhibits the engine from starting up.

When the gear shift lever 11 is in the R-N position, a combination of the outputs of the first group switch will be "001" that is the same as indicating the N position, while the output of the second switch group will be "0". The controller 17 determines that the switch S2 has failed and inhibits the engine from starting up.

When the gear shift lever 11 is in the D position, a combination of the outputs of the first group switch will be "101" that is the same as indicating the N-D position. This causes the controller 17 to determine in error that the gear shift lever 11 is in the N-D position.

Wire Disconnection in Switch S3

When the wire disconnection has occurred in the switch S3 of the first switch group, the output of the switch S3, as shown in FIG. 3(*d*), will be logic 0 in each of all the shift lever positions. When the gear shift lever 11 is in the R-N position, a combination of the outputs of the first group switch (i.e., the switches S1, S2, and S3) will be "010" that is the same as indicating the R position. This causes the controller 17 to determine in error that the gear shift position 11 is in the R position.

When the gear shift lever 11 is in the N position, a combination of the outputs of the first group switch will be "000", while the output of the second switch group will be "1". The controller 17 determines that the switch S3 has failed, but allows the engine to start up.

When the gear shift lever 11 is in the N-D position, a combination of the outputs of the first group switch will be "100" that is the same as indicating the P position, while the output of the second switch group will be "0". The controller 17 determines that the switch S3 has failed and inhibits the engine from starting up.

When the gear shift lever 11 is in the D position, a combination of the outputs of the first group switch will be "110" that is the same as indicating the P-R position. This causes the controller 17 to determine in error that the gear shift lever 11 is in the P-R position.

Wire Disconnection in Switch S4

When the wire disconnection has occurred in the switch S4 of the second switch group, the output of the switch S4, as shown in FIG. 3(e), will be logic 0 in each of all the shift lever positions. In such an event, when the switches S1, S2, and S3 of the first switch group are all operating normally, it enables the controller 17 to determine the position of the gear shift lever 11 correctly. However, even when the controller 17 has determined correctly that the gear shift lever 11 is in the P position or the N position, the output of the switch S4 will not be "1", thus causing the controller 17 to inhibit the engine from starting up and determine that the switch S4 has failed.

Short Circuit in Switch S1

When the short circuit has occurred in the switch S1 of the first switch group, the output of the switch S1, as shown in FIG. 4(b), will be logic 1 in each of all the shift lever positions. For example, when the gear shift lever 11 is in the R position, a combination of the outputs of the first group switch (i.e., the switches S1, S2, and S3) will be "110" that is the same as indicating the P-R position. The controller 17, thus, determines in error that the gear shift lever 17 is in the R-N position.

When the gear shift lever 11 is in the R-N position, a combination of the outputs of the first group switch will be "111" that is the same as indicating the position D. The controller 17, thus, determines in error that the gear shift lever 11 is in the D position. The manner of detecting the failure in this case will be described later in detail.

When the gear shift lever 11 is in the N position, a combination of the outputs of the first group switch will be "101" that is the same as indicating the N-D position, while the output of the second switch group will be "1" which allows the engine to be cranked. The controller 17 determines that the switch S1 has failed and allows the engine to start up.

Short Circuit in Switch S2

When the short circuit has occurred in the switch S2 of the first switch group, the output of the switch S2, as shown in FIG. 4(c), will be logic 1 in each of all the shift lever positions. For example, when the gear shift lever 11 is in the P position, a combination of the outputs of the first group switch (i.e., the switches S1, S2, and S3) will be "110" that is the same as indicating the position P-R, while the output of the second switch group (i.e., the switch S4) will be "1" which allows the engine to be cranked. The controller 17 determines that the switch S2 has failed and allows the engine to start up.

When the gear shift lever 11 is in the N position, a combination of the outputs of the first group switch will be "011" that is the same as indicating the R-N position, while the output of the second switch group will be "1". The controller 17 determines that the switch S2 has failed and allows the engine to start up.

When the gear shift lever 11 is in the N-D position, a combination of the outputs of the first group switch will be "111" that is the same as indicating the D position. The controller 17 determines in error that the gear shift lever 11 is in the D position.

Short Circuit in Switch S3

When the short circuit has occurred in the switch S3 of the first switch group, the output of the switch S3, as shown in FIG. 4(d), will be logic 1 in each of all the shift lever positions. When the gear shift lever 11 is in the P position, a combination of the outputs of the first group switch (i.e., the switches S1, S2, and S3) will be "101" that is the same as indicating the N-D position, while the output of the switch S4 will be "1". The controller 17 determines that the switch S3 has failed and allows the engine to start up.

When the gear shift lever 11 is in the P-R position, a combination of the outputs of the first group switch will be "111" that is the same as indicating the D position. The controller 17 determines in error that the gear shift lever 11 is in the D position.

When the gear shift lever 11 is in the R position, a combination of the outputs of the first group switch will be "011" that is the same as indicating the R-N position. The controller 17 determines in error that the gear shift lever 11 is in the R-N position.

Short Circuit in Switch S4

When the short circuit has occurred in the switch S4 of the second switch group, the output of the switch S4, as shown in FIG. 4(e), will be logic 1 in each of all the shift lever positions. In such an event, when the switches S1, S2, and S3 of the first switch group are all operating normally, it enables the controller 17 to determine the position of the gear shift lever 11 correctly. However, output of the switch S4 will be "1" even when the gear shift lever 11 is in the shift lever positions other than the P and N positions. The controller 17, thus, allows the engine to start up, but determines that the switch S4 has failed.

As will be apparent from the above discussion, there are some cases where it is impossible to avoid an error in determining the position of the gear shift lever 11 using combinations of the outputs of the switches S1, S2, S3, and S4. In order to eliminate this problem, the controller 17 is so designed that each time any one of the outputs of the first switch group (i.e., the switches S1, S2, and S3) has changed in the logic value, a determination is made whether the shift lever position represented by a resulting combination of the outputs of the switches S1, S2, and S3 is adjacent that represented by a combination thereof before such a change or not and that if a negative answer is obtained, it is determined that the failure has occurred.

For example, when the wire disconnection has occurred in the switch S1, as shown in FIG. 3(b), and the gear shift lever 11 has been moved from the P position, to the P-R position, and to the R position, the controller 17 determines in error that the gear shift lever 11 has been moved from the unidentified position X(s) to the R position. In this case, the controller 17 omits the P-R position. The failure of the switch S1 is, thus, detected by monitoring such an event which will also be refereed to as a position detection omission below.

In a case where the controller 17 is designed to sample the outputs of the switches S1, S2, and S3 of the first switch group in a constant cycle, as the speed at which the gear shift lever 11 is moved by the vehicle operator increases, the interval at which the outputs of the switches S1, S2, and S3 change in the logic value may decrease below the sampling cycle, which causes the controller 17 to omit sampling of one or some of combinations of the outputs of the switches S1, S2, and S3, that is, results in the position detection omission.

In order to avoid the above problem, the controller 17 is so designed as to initiate sampling of the outputs of the switches S1, S2, and S3 of the first switch group through interruption handling each time any one of them changes. This enables the controller 17 to read out all the outputs of the switches S1, S2, and S3 changing upon a shifting of the gear shift lever 11 in the order of the position of the gear shift lever 11 regardless of the speed of movement of the gear shift lever 11, thus eliminating the position detection omission.

The output of the switch S4 of the second switch group shows logic 1 in the P and N positions which permits the engine to be cranked and logic 0 in the other positions. Therefore, even when the gear shift lever 11 is moved quickly, the output of the switch S4 does not usually change in the logic value at speeds resulting in the position detection omission. For this reason, the controller 17 is designed to sample the output of the switch S4 in a constant cycle of, for example, 10 msec.

The determinations of the position of the gear shift lever 11 and the failure in operation of the shift lever position sensor 12 as described so far are made by software programs, as will be discussed below with reference to FIGS. 5 to 7 In the following discussion, the outputs of the switches S1, S2, S3, and S4, as inputted to the controller 17, will also be referred simply to as outputs S1, S2, S3, and S4, respectively.

Upon supply of power following turning on of an ignition switch of the vehicle, the controller 17 initiates the main program of FIG. 5. After entering the program, the routine proceeds to step 101 wherein flags and memories, as described later, are reset or initialized.

The routine proceeds to step 102 wherein the output of the switch S4 of the second switch group stored in the memory is updated. Specifically, the output of the switch S4 which was stored one program cycle earlier as a current output SS4 is updated as a previous output SS40, while the output of the switch S4, as picked up in this program cycle (i.e., the output S4) is stored as the current output SS4.

The routine proceeds to step 103 wherein it is determined whether the current output SS4 is identical with the previous output SS40 or not. If a NO answer is obtained, then the routine proceeds to step 104 wherein a signal S4 change flag is set to one (1) meaning that the output of the switch S4 has changed in the logic value from that one program cycle earlier. The routine proceeds to step 109 wherein it is determined that a sampling interval (e.g., 10 msec.) at which the output S4 is sampled by the controller 17 has passed or not. If a NO answer is obtained, the routine repeats step 109. If a YES answer is obtained meaning that the sampling interval has passed, then the routine proceeds to step 102 in which the output S4 is sampled, and the current output SS4 and the previous output SS40 are updated.

Subsequently, the routine proceeds to step 103 wherein it is determined whether the current output SS4 is identical with the previous output SS40 or not. If a YES answer is obtained, then the routine proceeds to step 105 wherein it is determined whether the signal S4 change flag is one (1) or not. If a YES answer is obtained meaning that the output of the switch S4 has changed in the logic value from that one program cycle earlier, then the routine proceeds to step 106 wherein the previous output SS40 is set as a signal S4 value FS4. The routine proceeds to step 107 wherein the signal S4 change flag is reset to zero (0) and then proceeds to step 108. If a NO answer is obtained in step 105, then the routine proceeds directly to step 108.

Specifically, a sequence of steps 102 to 107 are performed periodically in the sampling cycle (e.g., 10 msec.) of the output S4 to update the signal S4 value FS4 each time a change in the output S4 is detected.

Except when the output S4 has changed, the position of the gear shift lever 11 is determined, and the failure in operation of the shift lever position sensor 12 is detected in step 108. The operation of step 108 is illustrated in FIG. 7, as will be referred to later in detail.

Figure 6:
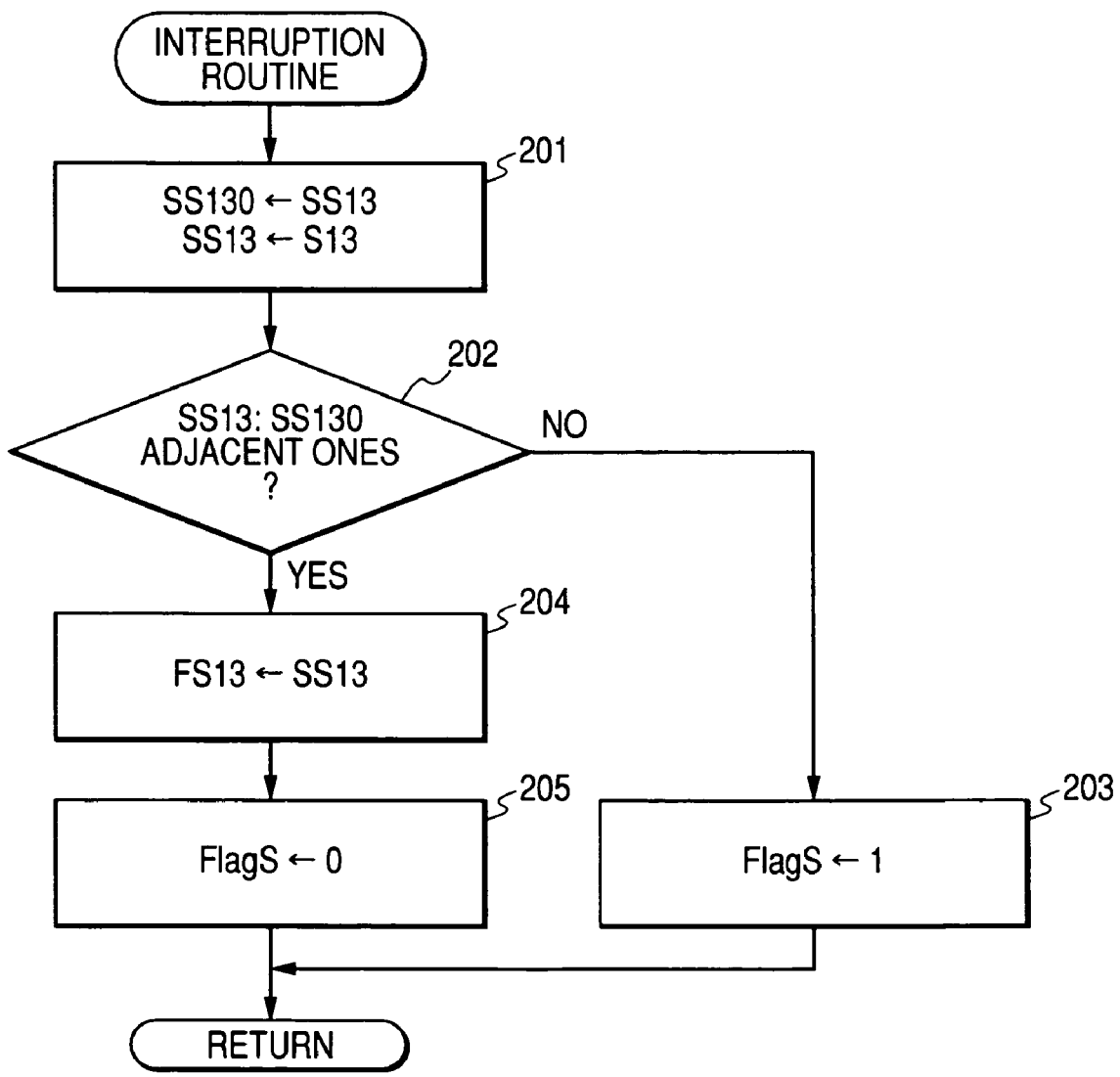
FIG. 6 is a flowchart of a sub-program to be executed by interruption handling in the main program of FIG. 5.

FIG. 6 shows an interruption routine which is initiated each time any one of the outputs of the switches S1, S2, and S3 of the first switch group changes in the logic value.

First, in step 201, the outputs of the switches S1, S2, and S3 are sampled to produce a three-bit code S13 made up a sequence of them. Additionally, a three-bit code which was produced and stored one program cycle earlier as a current three-bit code SS13 is updated as a previous three-bit code SS130, while the three-bit code S13, as produced in this program cycle, is stored as the current three-bit code SS13.

The routine proceeds to step 202 wherein the current three-bit code SS13 (i.e., a three-bit code produced after any one of the outputs S1, S2, and S3 changes) is compared with the previous three-bit code SS130 (i.e., a three-bit code produced before such a change) to determine whether they are adjacent ones or not, that is, whether they represent adjacent two of the shift lever positions or not. If a NO answer is obtained, then the routine proceeds to step 203 wherein the failure flag FlagS is set to one (1) meaning that the failure has occurred in the shift lever position sensor 12. The routine then terminates.

Alternatively, if a YES answer is obtained in step 202, then the routine proceeds to step 204 wherein the current three-bit code SS13 is set as a three-bit code FS13. The routine proceeds to step 205 wherein the failure flag FlagS is reset to zero (0) meaning the absence of the failure of the shift lever position sensor 12. The routine then terminates.

Figure 7:
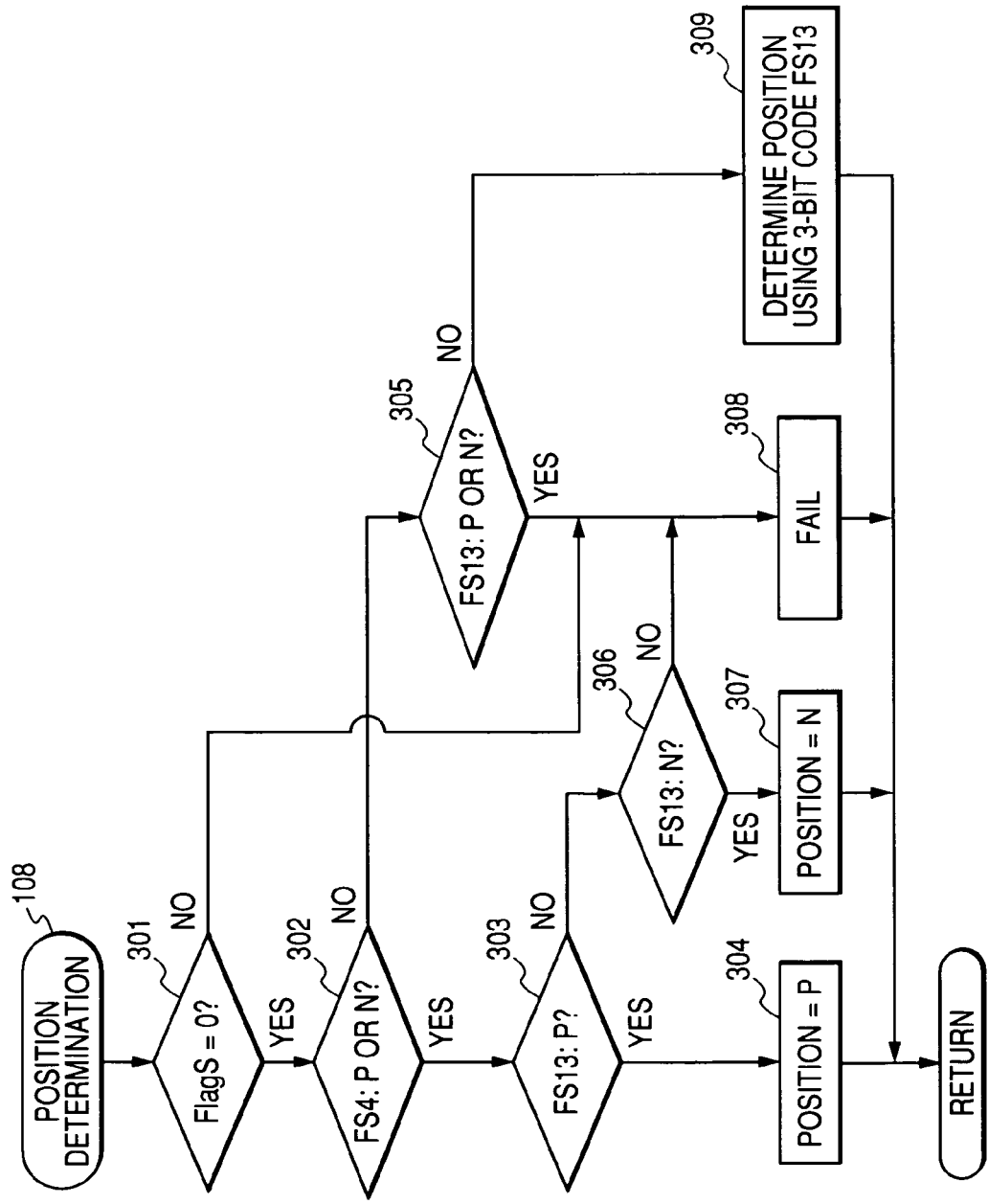
FIG. 7 is a flowchart of a sub-program to be executed in the main program of FIG. 5 to monitor a position and a failure of a gear shift lever.

FIG. 7 shows the operation as executed in step 108 of FIG. 5 to determine the position of the gear shift lever 11 and whether the shift lever position sensor 12 is malfunctioning or not.

First, in step 301, it is determined whether the failure flag FlagS shows zero (0) or not which indicates the absence of the failure in the shift lever position sensor 12. If a NO answer is obtained meaning that the failure flag FlagS is one (1), then the routine proceeds directly to step 308 wherein the failure has occurred in the shift lever position sensor 12. The routine then terminates.

Alternatively, if a YES answer is obtained in step 301 meaning that the failure flag FlagS is one (1), then the routine proceeds to step 302 wherein it is determined whether the signal S4 value FS4, as derived in step 106 of FIG. 5, is one (1) which represents the P or N position of the gear shift lever 11 or not. If a YES answer is obtained, then the routine proceeds to step 303 wherein it is determined whether the three-bit code FS13, as derived in step 204 of FIG. 6, is a sequence of "100" indicating the P position or not. If a YES answer is obtained, then the routine proceeds to step 304 wherein the current position of the gear shift lever 11 is the P position. The routine then terminates.

Alternatively, if a NO answer is obtained in step 302 meaning that the signal S4 value FS4 is not one (1), that is, that the gear shift lever 11 is determined to be in the position other than the P or N position, then the routine proceeds to step 305 wherein it is determined whether the three-bit code FS13, as derived in step 204 of FIG. 6, is either one of sequences of "100" and "001" indicating the P and N positions or not. If a YES answer is obtained, then the routine proceeds to step 308 wherein it is determined that the failure has occurred in the shift lever position sensor 12. The routine then terminates. Specifically, the signal S4 value FS4 is determined in step 302 as indicating neither of the P and N positions, but however, the three-bit code FS13 is determined in step 305 as indicating either one of the P and N positions. The decisions in steps 302 and 305 contradict each other, thus determining the failure to have occurred in the shift lever position sensor 12.

If a NO answer is obtained in step 305 meaning that the shift lever positions, as indicated by the signal S4 value FS4 and the three-bit code FS13, are identical with each other when the gear shift lever 11 is determined not to be in the P or N position, then the routine proceeds to step 309 wherein the position of the gear shift lever 11 is determined using the three-bit code FS13. For example, if the three-bit code FS13 is a sequence of "110", the gear shift lever 11 is determined to be placed in the P-R position. If the three-bit code FS13 is a sequence of "010", "011", "101" or "111", the gear shift lever 11 is determined to be placed in the R position, the R-N position, the N-D position, or the D position.

If a NO answer is obtained in step 303 meaning that the three-bit code FS13 is not a sequence of "100" indicating the P position, then the routine proceeds to step 306 wherein it is determined whether the three-bit code FS13 is a sequence of "001" indicating the N position or not. If a YES answer is obtained, then the routine proceeds to step 307 wherein the current position of the gear shift lever 11 is the N position. The routine then terminates.

Alternatively, if a NO answer is obtained in step 306 meaning that the signal S4 value FS4 is determined in step 302 as indicating the P or N position, but however, the three-bit code FS13 is determined through steps 303 and 306 as indicating neither of the P and N positions, the decisions in steps 303 and 306 are determined to contradict each other. The routine then proceeds to step 308 wherein it is determined that the failure has occurred in the shift lever position sensor 12. The routine then terminates.

As described above, the AT range sensor system of this embodiment is designed to classify the switches S1, S2, S3, and S4 of the shift lever position sensor 12 into the first switching group made up of the switches S1, S2, and S3 and the second switching group consisting of the switch S4, produce a three-bit code, as expressed by a sequence of binary outputs of the first switch group, representing each of the seven positions of the gear shift lever 11, and configures the switch S4 to output a specified binary signal when the gear shift lever 11 is in the P or N position which is different from those outputted when the gear shift lever 11 is in the other positions. This results in increased accuracy of determining the position of the gear shift lever 11 and an increased number of failures in operation of the shift lever position sensor 12.

The switches S1, S2, and S3 are so designed as to change only one of outputs thereof between adjacent two of all the shift lever positions, thus avoiding matching between a binary pattern of the outputs of the switches S1, S2, and S3 in each of the P, R, N, and D positions and that in one of the P-R, R-N, and N-D positions in the event that only one of the switches S1, S2, S3, and S4 has failed. This eliminates an error in determining the position of the gear shift lever 11.

The switches S1, S2, and S3 are also designed to output an at least one active signal (i.e., logic 1) in each of all the positions of the gear shift lever 11, thus allowing the wire disconnection to be determined to have occurred in the ground line Lgnd of the shift lever position sensor 12.

The controller 17 is so designed that each time any one of the switches S1, S2, and S3 of the first switch group changes in the logic value, the interruption handling routine is performed to sample the outputs of the switches S1, S2, and S3. Specifically, the controller 17 works to read out all the outputs of the switches S1, S2, and S3 changing upon a shifting of the gear shift lever 11 in the order of the position of the gear shift lever 11 regardless of the speed of movement of the gear shift lever 11, thus eliminating the position detection omission.

The automatic transmission, as referred to in this embodiment, is switched in operation between four gear ranges: the P range, the R range, the N range, and the D range upon a shifting of the gear shift lever 11, but may be designed to have five or more gear ranges. In a case of a five-gear range automatic transmission, the shift lever position sensor 12 is designed to have five switches which are broken down into a first switch group consisting of four of them and a second switch group consisting of the rest of them. A four-bit code is formed using binary signals outputted from the first switch group as representing the position of the gear shift lever 11. The second switch group may alternatively be made up of some of the switches. In this case, the outputs of the second switch group may be so constructed as to distinguish between the P and N position of the gear shift lever 11 or between the other positions thereof.

Each of the switches S1, S2, S3, and S4 is of a contact type, but may alternatively be of a non-contact type such as a Hall element, a magnetic sensor, or an optical sensor. In a case of use of the magnetic sensors, they are installed on the slidable lever 13 instead of the movable contacts 15. Magnetic members are used in place of the stationary contacts 16 to produce changes in outputs of the magnetic sensors when facing the magnetic members. In a case of use of the optical sensors, they are installed on the slidable lever 13 instead of the movable contacts 15. Slits are formed in areas to which the stationary contacts 16 are affixed to produce changes in outputs of the optical sensors when facing the slits. Use of such a non-contact type sensor offers the advantage in that the durability of the shift lever position sensor 12 is improved.

Figure 8:
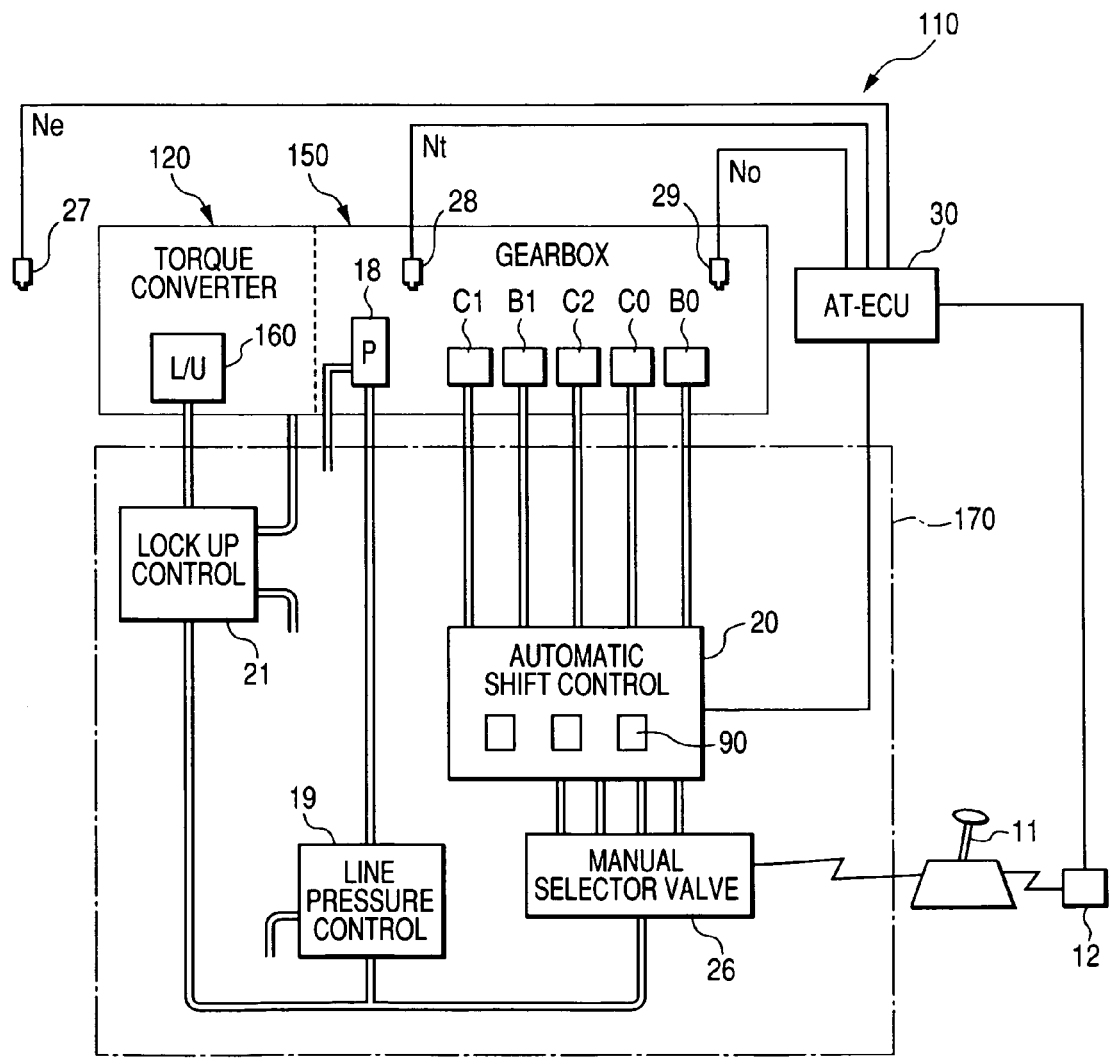
FIG. 8 is a block diagram which shows an automatic transmission control system according to the second embodiment of the invention.

FIG. 8 shows an automatic transmission control system according to the second embodiment of the invention.

Figure 9:
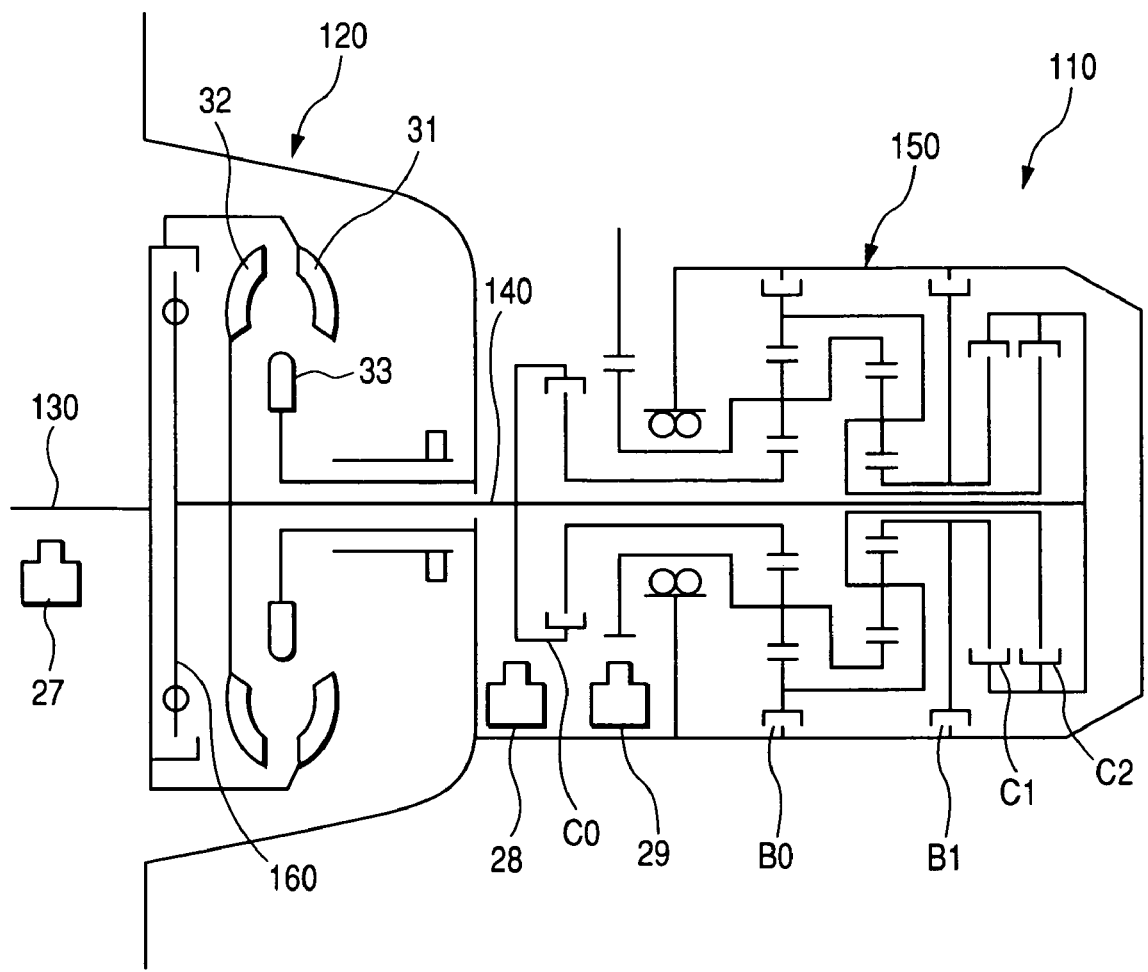
FIG. 9 is a schematic cross sectional view which shows an internal structure of an automatic transmission.

The automatic transmission 110, as referred to this embodiment, is of a four-speed type which includes, as clearly shown in FIG. 9, a torque converter 120 and a hydraulic transmission gearbox 150. The torque converter 120 has an input shaft 130 joined to an output shaft of an automotive engine (not shown) and an output shaft 140 jointed to the hydraulic transmission gearbox 150. The torque converter 12 has installed therein a pump impeller 31 (i.e., a fluid coupling), turbine runner 32, and a stator 33 disposed between the pump impeller 31 and the turbine runner 32. The pump impeller 31 faces the turbine runner 32 and connects with the input shaft 130 of the torque converter 120. The turbine runner 32 connects with the output shaft 140 of the torque converter 120. The stator 33 works to rectify the torque converter oil.

The torque converter 120 also includes a lock-up clutch 160 which works to selectively establish or release engagement of the output shaft 140 with the input shaft 130. The torque converter 120 works to transmit engine torque to driven wheels of the automotive vehicle through a gear train such as a planetary gear train of the transmission gearbox 150.

The transmission gearbox 150 includes clutches C0, C1, and C2 and brakes B0 and B1. A selected gear ratio is established by hydraulically controlling engagement and disengagement of the clutches C0, C1, and C2 and the brakes B0 and B1 to change a combination of gears through which the torque is to be transmitted. FIG. 10 shows operative relations between the gear ranges of the automatic transmission 110 (i.e., the positions of the gear shift lever 11 and shifted speeds: first to fourth speeds) and operative conditions of frictional elements (i.e., the clutches C0, C1, and C2 and the brakes B0 and B1). "○" indicates the clutches C0, C1, and C2 and brakes B0 and B1 placed in engagement in a selected one of the gear ranges to establish the transmission of engine torque. For example, when it is required to make a downshift from the third to second speed, of the clutches C0 and C2 placed in engagement at the third speed, the clutch C2 is brought into disengagement, while the brake B1 is brought into engagement, thereby achieving the downshift to the second speed. When it is required to make an upshift from the third to fourth speed, of the clutches C0 and C2 placed in engagement at the third speed, the clutch C0 is brought into disengagement, while the brake B1 is brought into engagement, thereby achieving the upshift to the fourth speed.

Referring back to FIG. 8, the transmission gearbox 150 has installed therein a hydraulic pump 18 driven by the engine output. A hydraulic control circuit 170 is installed within an oil pan (not shown) within which working fluid is stored. The hydraulic control circuit 170 consists of a line pressure control circuit 19, an automatic shift control circuit 20, a lock-up control circuit 21, and a manual selector valve 26. The working fluid pumped by the hydraulic pump 18 out of the oil pan is supplied to the automatic shift control circuit 20 and the lock-up control circuit 21 through the line pressure control circuit 19. The line pressure control circuit 19 has installed therein a hydraulic control valve (not shown) which works to adjust the pressure of the working fluid from the hydraulic pump 18 to a selected line pressure. The automatic shift control circuit 20 has installed therein a plurality of hydraulic control valves 90 which work to control the pressure of the working fluid to be supplied to the clutches C0, C1, and C2 and the brakes B0 and B1 of the transmission gearbox 150. The lock-up control circuit 21 has installed therein a hydraulic control valve (not shown) which works to control the pressure of the working fluid to be supplied to the lock-up clutch 160. The hydraulic circuit in the automatic shift control circuit 20 in which the hydraulic control valves 90 are installed is of a typical one. Japanese Patent First Publication No. 2002-130460 discloses such a structure, the disclosure of which is incorporated herein by reference.

The manual selector valve 26 is disposed between the line pressure control circuit 19 and the automatic shift control circuit 20 to select one or some of hydraulic supply lines to establish hydraulic communications with a corresponding one or ones of the hydraulic control valves 90 of the automatic shift control circuit 20 in response to a shifting motion of the gear shift lever 11. Specifically, the manual selector valve 26 works to establish the hydraulic communications between the hydraulic supply line and the hydraulic control valves 90 leading to the clutches C0 and C2 and the brakes B0 and B1 required to establish forward gear ratios (i.e., forward speeds) only when the gear shift lever 11 is placed in the D position. When the gear shift lever 11 is shifted to P or N position, the manual selector valve 26 blocks the hydraulic communications between the hydraulic supply lines and all the clutches C0, C1, and C2 and the brakes B0 and B1 to bring the transmission gear box 150 in a neutral state.

An engine speed sensor 27 is installed on the engine which measures an engine speed Ne. The transmission gear box 150 also includes an input shaft speed sensor 28 and an output shaft speed sensor 29. The input shaft speed sensor 28 works to measure an input shaft speed Nt (i.e., the speed of the output shaft 140 of the torque converter 120). The output shaft speed sensor 29 works to measure an output shaft speed No of the transmission gearbox 150.

Outputs of the engine speed sensor 27, the input shaft speed sensor 28, the output shaft speed sensor 29, and the shift lever position sensor 12 are inputted to an automatic transmission electronic control unit (AT-ECU) 30. The AT-ECU 30 is implemented by a microcomputer and executes gear shift programs installed in a ROM to control energization of the hydraulic control valves 90 of the automatic shift control circuit 20 and regulates the hydraulic pressure acting on the clutches C0, C1, and C2 and the brakes B0 and B1 of the transmission gearbox 150 to establish or release the engagement thereof in response to a gear shift request produced based on the position of the gear shift lever 11 and vehicle running conditions (e.g., throttle position, vehicle speed, etc.), thereby establishing a target gear ratio in the transmission gearbox 150 selected according to a given shift schedule.

Figure 11:
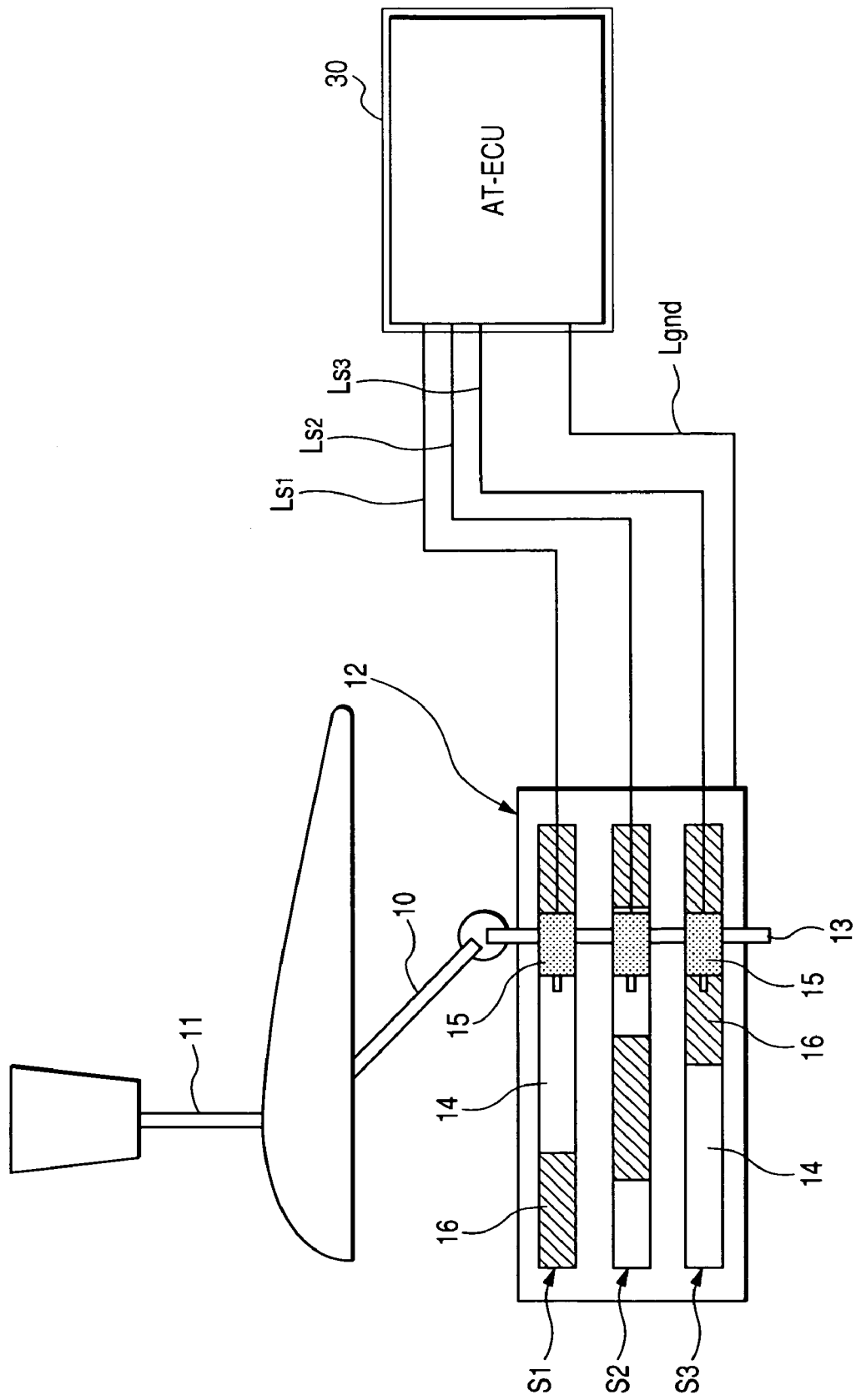
FIG. 11 is a view which shows an automatic transmission sensor system according to the second embodiment of the invention.

The shift lever position sensor 12 used in this embodiment includes, as shown in FIG. 11, a slidable lever 13 joined to the gear shift lever 11 through a bar link 10.

The shift lever position sensor 12 also includes three switches S1, S2, and S3 each of which is made up of an insulator 14, a movable contact 15, and a stationary contact 16. The movable contacts 15 are arrayed and attached to the slidable lever 13. The stationary contacts 16 are, as can be seen from the drawing, affixed to the insulators 14 at locations different from each other. The movable contacts 15 are electrically coupled with input ports of the AT-ECU 30 through signal lines Ls1, Ls2, and Ls3, respectively. Each of the stationary contacts 16 is connected to a ground terminal of the AT-ECU 30 through a ground line Lgnd. When the gear shift lever 11 is manually pulled or pushed to change the P, R, N, and D ranges of the automatic transmission 110 one to another, it will cause the slidable lever 13 to move to have the movable contacts 15 slide on the insulators 14, thereby making one or some of electrical connections between the movable contacts 15 and the stationary contacts 16 to produce a combination of active or inactive signals (i.e., binary signals of 1 or 0) to the AT-ECU 30 through the signal lines Ls1, Ls2, and Ls3 as indicating the position of the gear shift lever 11.

When each of the movable contacts 15 makes an electrical connection with a corresponding one of the stationary contacts 16, it will produce the active signal, while when it makes no electrical connection, it will produce the inactive signal. The active and inactive signals are inputted to the I/O interface circuit of the AT-ECU 30 and changed into a logic one (1) and a logic zero (0), respectively. The AT-ECU 30 works to analyze, as will be described later in detail, a combination of the logic signals arrayed in a preselected sequence to determine the position of the gear shift lever 11 and also determine whether the shift lever position sensor 12 is malfunctioning or not.

The automatic transmission 110 is designed to change the gear ranges in a shift pattern of P-R-N-D. The shift lever position sensor 12, like that in the first embodiment, is designed to monitor a total of seven shift lever positions: the P position, the R position, the N position, the D position, the P-R position, the R-N position, and the N-D position.

The seven shift lever positions, as described above, are each expressed by a three-bit code.

Generally, it is possible for the three-bit code to represent $2^3$=eight (8) binary patterns. The number of positions of the gear shift lever 11 to be monitored by the shift lever position sensor 12 is, as described above, seven (7). The AT control system of this embodiment does not use one of the eight bit patterns in determining the position of the gear shift lever 11. Specifically, the AT control system is designed to use seven of the eight bit patterns for representing the positions of the gear shift lever 11 except one, as expressed by a sequence of all the inactive signals (i.e., logic 0s), in order to detect the failure in operation of the shift lever position sensor 12. In other words, the shift lever position sensor 12 is designed to output the active signal (i.e., the logic 1) from at least one of the switches S1, S2, and S3 in order to express each of the seven bit patterns representing the P, R, N, D, P-R, R-N, and N-D positions.

In order to avoid an error in determining the position of the shift lever 11 which arises from matching between one of the four binary patterns indicating the P, R, N, and D positions and another one if a failure such as wire breakage or short circuit occurs in the shift lever position sensor 12, the AT-ECU 30 is constructed to represent the seven shift lever positions, as described above, using Gray codes. Specifically, the switches S1, S2, and S3 are so designed that the output of only one of the switches S1, S2, and S3 changes in the logic level upon shifting of the gear shift lever 11 from one of the seven positions (i.e. the P, R, N, D, P-R, R-N, and N-D positions) to an adjacent one.

Specifically, the seven binary patterns are, as already described in the first embodiment, broken down into three first types in which only one bit of the three-bit code is logic 1, three second types in which two bits of the three-bit code are logic 1, and one third type in which all bits of the three-bit code are logic 1. According to definitions of the Gray code, the second type binary codes in which two of three bits are logic 1 are used as indicating the intermediate shift lever positions (i.e., the P-R position, the R-N position, and the N-D position). Consequently, the P, R, N, and D positions of the gear shift lever 11 are expressed by three binary patterns (i.e., the first type binary codes) in which only one bit is logic 1 and one binary pattern (i.e., the third type binary code) in which all three bits are logic 1. If the P and N positions are expressed by the third type binary code in which all three bits are logic 1, it will make it impossible to detect the short circuit in each of the switches S1, S2, and S3 only when the gear shift lever 11 is in any one of the intermediate shift lever positions (i.e., the P-R position, the R-N position, and the N-D position), thus resulting in a decrease in the binary patterns useful for monitoring the failure in operation of the shift lever position sensor 12. Alternatively, if the R position is expressed by the third type binary code, it will result in an error in which the N-D position is determined as the R position, thereby causing back-up lamps to be turned on in error. From these points of view, the third type binary code in which all three bits are logic 1 is preferably used to represent the D position of the gear shift lever 11.

Figure 12:
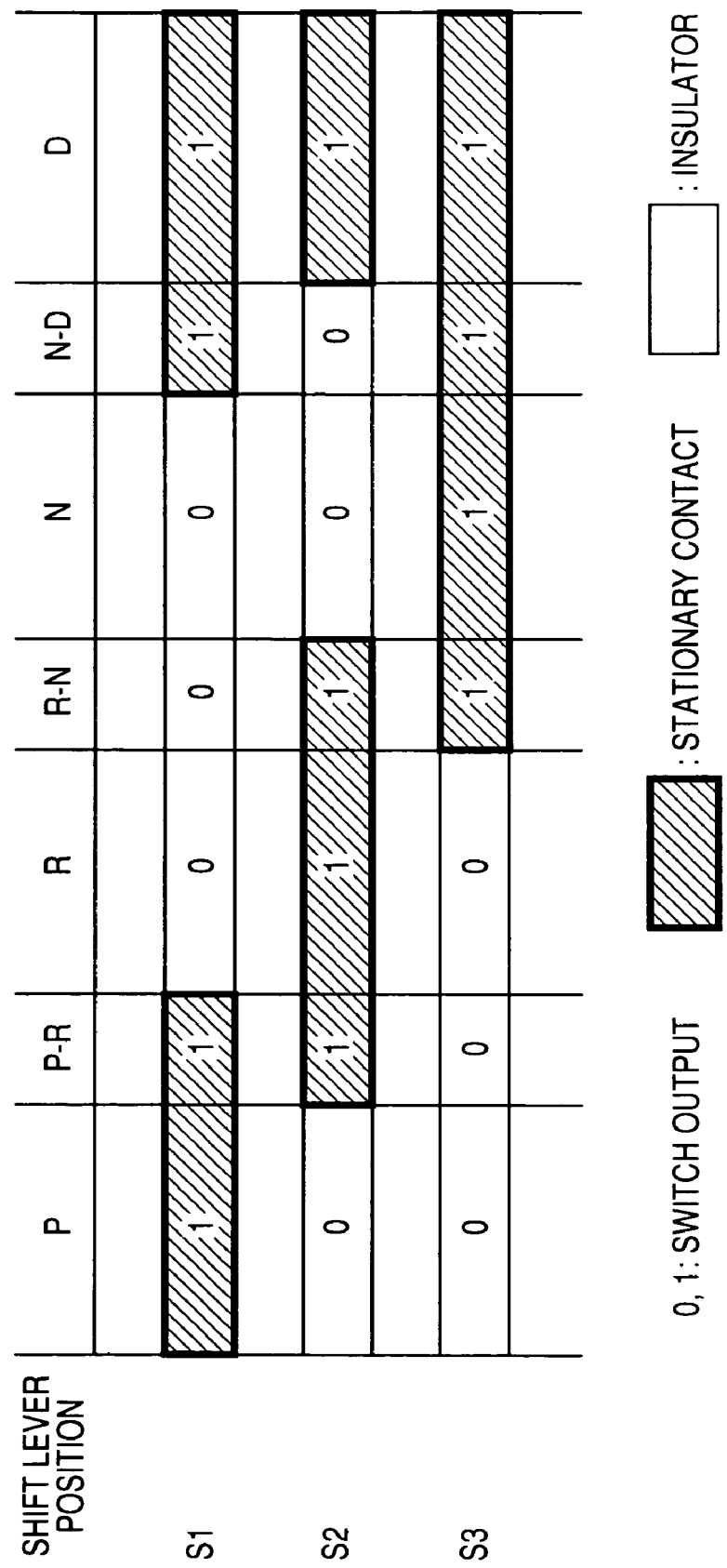
FIG. 12 is a diagram which shows patterns of combinations of on- and off-states of switches of a lever position sensor.

In the manner as described above, combinations of logic signals, as listed in FIG. 13(a), are assigned to the switches S1, S2, and S3 as indicating the seven positions of the gear shift lever 11 to be monitored by the shift lever position sensor 12. The stationary contacts 16 of the switches S1, S2, and S3 are affixed to the insulators 14 at locations, as indicated by hatched areas in FIG. 12, where they make electric connections with the movable contacts 15 to produce the binary signal of 1.

The three-bit codes formed by combinations of the outputs of the switches S1, S2, and S3 are "100" in the P position, "110" in the P-R position, "010" in the R position, "011" in the R-N position, "001" in the N position, "101" in the N-D position, and "111" in the D position.

The binary patterns, as expressed by the switches S1, S2, and S3, upon a failure in operation of the shift lever position sensor 21 will be analyzed blow with reference to FIGS. 13(a) to 14(d).

The AT-ECU 30 is, like the controller 17, designed that designed that each time any one of the outputs of the switches S1, S2, and S3 changes in the logic value, a determination is made whether the shift lever position represented by a resulting combination of the outputs of the switches S1, S2, and S3 is adjacent that represented by a combination thereof before such a change or not and that if a negative answer is obtained, it is determined that the failure has occurred in the shift lever position sensor 12. Additionally, if an error code of "000" appears upon turning on of the AT-ECU 30, the AT-ECU 30 determines that the shift lever position 12 has failed.

Wire Disconnection in Switch S1

When the wire disconnection has occurred in the switch S1, the output of the switch S1, as shown in FIG. 13(b), will be logic 0 in each of all the shift lever positions. For example, when the gear shift lever 11 is in the D position, a combination of the outputs of the switches S1, S2, and S3 will be "011", thus causing the AT-ECU 30 to determine in error that the gear shift lever 11 is in the R-N position. In order to eliminate a difficulty in running the vehicle airing from such an error, the AT-ECU 30 is designed to perform a deemed D-position hydraulic transmission control, as will be described later in detail, whenever the position of the gear shift lever 11 is determined as the R-N position. In the case where the position of the gear shift lever 11 is determined as the R-N position, and it is possible to change the gear of the automatic transmission 110 to run the vehicle, it is found that the gear shift lever 11 is now in the D position. The AT-ECU 30 may determine that the shift lever position sensor 12 is failing.

If the switch S1 has undergone a wire disconnection and thus outputted the logic 0 signal during running of the vehicle with the gear shift lever 11 placed in the D position, it results in a change in a binary pattern made up of outputs of the switches S1, S2, and S3 which does not usually occur upon a change in the position of the gear shift lever 11 from the D to R-N position. This enables the AT-ECU 30 to determine that the shift lever position sensor 12 has failed.

Alternatively, if the switch S1 has undergone a wire disconnection and thus outputted the logic 0 signal when the gear shift lever 11 is placed in the P position, it results in an erroneous binary code of "000". This permits the AT-ECU 30 to determine that the shift gear position sensor 12 has failed.

If the switch S1 has undergone the wire disconnection when the gear shift lever 11 is placed in any one of the P-R, R, R-N, N, and N-D positions, the position of the gear shift lever 11, as determined by the AT-ECU 30, is not changed or changed to an adjacent one. It is, thus, impossible to detect the failure of the shift lever position sensor 12. However, in such an event, shifting the gear shift lever 11 to the D position causes the position thereof to be determined in error as the R-N position. The AT-ECU 30 starts the deemed D-position hydraulic transmission control to secure the running of the vehicle.

In any case, the AT-ECU 30 works to control the hydraulic control valves 90 of the automatic transmission 110 so as to establish a given speed (e.g., a third speed) in the D range of the automatic transmission 110 upon detection of the failure of the shift lever position sensor 12. This enables the vehicle to be run when the vehicle operator places the gear shift lever 11 in the D position.

Wire Disconnection in Switch S2

When the wire disconnection has occurred in the switch S2, the output of the switch S2, as shown in FIG. 13(c), will be logic 0 in each of all the shift lever positions. For example, when the gear shift lever 11 is in the D position, a combination of the outputs of the switches S1, S2, and S3 will be "101" that is the same as indicating the position N-D. The AT-ECU 30 determines in error that the gear shift lever 12 is placed in the N-D position. Whenever the position of the gear shift lever 11 is determined as the N-D position, whether it is erroneous or correct, the AT-ECU 30, as described above, works to perform the deemed D-position hydraulic transmission control to secure running of the vehicle in the D range of the automatic transmission 110. In the case where the position of the gear shift lever 11 is determined as the N-D position, but it is possible to change the gear of the automatic transmission 110 to run the vehicle, it is found that the gear shift lever 11 is actually in the D position. The AT-ECU 30 may determine that the shift lever position sensor 12 is failing.

The AT-ECU 30 is designed to handle two cases in different manners when the gear shift lever 11 has changed from the D to N-D position and from N to N-D position. Specifically, when the gear shift lever 11 has changed from the D to N-D position, the AT-ECU 30 immediately performs the deemed D-position hydraulic transmission control. While the gear shi lever 11 has changed from the N to N-D position, the AT-ECU 30 starts the deemed D-position hydraulic transmission control after the gear shift lever 11 is held in the N-D position for a given period of time.

When the shift lever position sensor 12 is in a normal state, and the AT-ECU 30 monitors a change in the position of the gear shift lever 11 from the N to N-D position, the AT-ECU 30 usually must monitor a change from the N-D to D position subsequently. Therefore, if the gear shift lever 11 is still determined to be held in the N-D position after a lapse of a time which is typically considered to be consumed by a change in the position of the gear shift lever 11 from the N-D to D position, the AT-ECU 30 determines that the shift lever position sensor 12 has failed, and initiates the deemed D-position hydraulic transmission control in the automatic transmission 110.

If the switch S2 has undergone the wire disconnection when the gear shift lever 11 is placed in the R position, so that the switch S2 outputs the logic 0 signal, it will result in an erroneous binary code of "000". This permits the AT-ECU 30 to determine that the shift gear position sensor 12 has failed.

If the switch S2 has undergone the wire disconnection when the gear shift lever 11 is placed in either of the P and P-R positions, the position of the gear shift lever 11, as determined by the AT-ECU 30, is not changed or alternatively changed to an adjacent one. It is, thus, impossible to detect the failure of the shift lever position sensor 12. However, in such an event, when the gear shift lever 11 is shifted to the D position, it will cause an erroneous binary code "000" to be produced upon passage of the gear shift lever 11 through the R position. This enables the AT-ECU 30 to determine that the shift lever position sensor 12 has failed.

Alternatively, If the switch S2 has undergone the wire disconnection when the gear shift lever 11 is placed in any one of the R-N, N, and N-D positions, the position of the gear shift lever 11, as determined by the AT-ECU 30, is not changed or alternatively changed to an adjacent one. It is, thus, impossible to detect the failure of the shift lever position sensor 12. However, in such an event, when the gear shift lever 11 is shifted to the D position, it will cause the AT-ECU 30 to determine in error that the gear shift lever 11 is placed in the N-D position. The AT-ECU 30, thus, starts the deemed D-position hydraulic transmission control in the automatic transmission 110 to secure the running of the vehicle.

In any case, the AT-ECU 30 works to control the hydraulic control valves 90 so as to establish a given speed in the D range of the automatic transmission 110 upon detection of the failure of the shift lever position sensor 12. This enables the vehicle to be run when the vehicle operator places the gear shift lever 11 in the D position.

Wire Disconnection in Switch S3

When the wire disconnection has occurred in the switch S3, the output of the switch S3, as shown in FIG. 13(d), will be logic 0 in each of all the shift lever positions. For example, when the gear shift lever 11 is in the D position, a combination of the outputs of the switches S1, S2, and S3 will be "110" that is the same as indicating the P-R position. This causes the At-ECU 30 to determine in error that the gear shift position 11 is in the P-R position. However, if the switch S3 has undergone the wire disconnection and thus outputted the logic 0 signal during running of the vehicle with the gear shift lever 11 placed in the D position, it results in a change in a binary pattern made up of outputs of the switches S1, S2, and S3 which does not usually occur upon a change in the position of the gear shift lever 11 from the D to P-R position. This enables the AT-ECU 30 to determine that the shift lever position sensor 12 has failed.

Alternatively, if the switch S3 has undergone a wire disconnection when the gear shift lever 11 is placed in the N position, it results in an erroneous binary code of "000". This permits the AT-ECU 30 to determine that the shift gear position sensor 12 has failed.

If the switch S3 has undergone the wire disconnection when the gear shift lever 11 is placed in any one of the P, P-R, R, and R-N positions, the position of the gear shift lever 11, as determined by the AT-ECU 30, is not changed or changed to an adjacent one. It is, thus, impossible to detect the failure of the shift lever position sensor 12. However, in such an event, when the gear shift lever 11 is shifted to the D position, it will cause an erroneous binary code of "000" to be produced upon passage of the gear shift lever 11 through the N position. This permits the AT-ECU 30 to determine that the shift gear position sensor 12 has failed.

If the switch S3 has undergone the wire disconnection when the gear shift lever 11 is placed in the N-D position, it immediately produces a binary pattern made up of outputs of the switches S1, S2, and S3 which does not usually occur upon a change in the position of the gear shift lever 11 from the N-D to P position. This enables the AT-ECU 30 to determine that the shift lever position sensor 12 has failed.

In any case, the AT-ECU 30 works to control the hydraulic control valves 90 so as to establish a given speed in the D range of the automatic transmission 110 upon detection of the failure of the shift lever position sensor 12. This enables the vehicle to be run when the vehicle operator places the gear shift lever 11 in the D position.

Short Circuit in Switch S1, S2, or S3

If the short circuit has occurred in any of the switches S1, S2, and S3, but the gear shift lever 11 is placed in the D position, the AT-ECU 30, as apparent from FIGS. 7(b) to 7(d), determines correctly that the gear shift lever 11 is in the D position, thus enabling the vehicle to run in the D range of the automatic transmission 110.

As described above, in order to avoid an unwanted case where the failure of the shift lever position sensor 12 results in the impossibility of operating the automatic transmission 110 to run the vehicle, the AT-ECU 30 works to perform the deemed D-position hydraulic transmission control to secure the running of the vehicle whenever the gear shift lever 11 is determined to be placed in the R-N position or N-D position in error or correctly. The deemed D-position hydraulic transmission control is to control the hydraulic control valves 90 to establish a given forward speed (e.g., the third speed) in the D range. When the gear shift lever 11 is determined correctly as being in the R-N or N-D position, the manual selector valve 26 is not in a position which establishes the hydraulic circuits through which the hydraulic pressure is supplied to some of the frictional elements of the automatic transmission 110 required to achieve the forward speed. Consequently, the forward speed is not established to run the vehicle regardless of the deemed D-position hydraulic transmission control.

When the gear shift lever 11 is in the D position, the manual selector valve 26 is placed in a corresponding D position. In such an event, when the gear shift lever 11 is determined in error as being in the R-N or N-D position, the forward speed of the automatic transmission 110 may be achieved by the deemed D-position hydraulic transmission control. Specifically, the deemed D-position hydraulic transmission control enables the vehicle to run when the gear shift lever 11 is placed in the D position even if the failure of the shift lever position sensor 12 is detected. The automatic transmission control system of this embodiment includes hydraulic pressure sensors or hydraulic switches which work to measure the hydraulic pressures acting on the frictional elements of the automatic transmission 110 to be placed under the deemed D-position hydraulic transmission control to determine the status of the automatic transmission 110 (i.e., degree of engagement of the frictional elements).

The determination of the position of the gear shift lever 11, the detection of the failure of the shift lever position sensor 12, and the deemed D-position hydraulic transmission control are achieved with programs, as illustrated in FIGS. 15 to 20.

Figure 15:
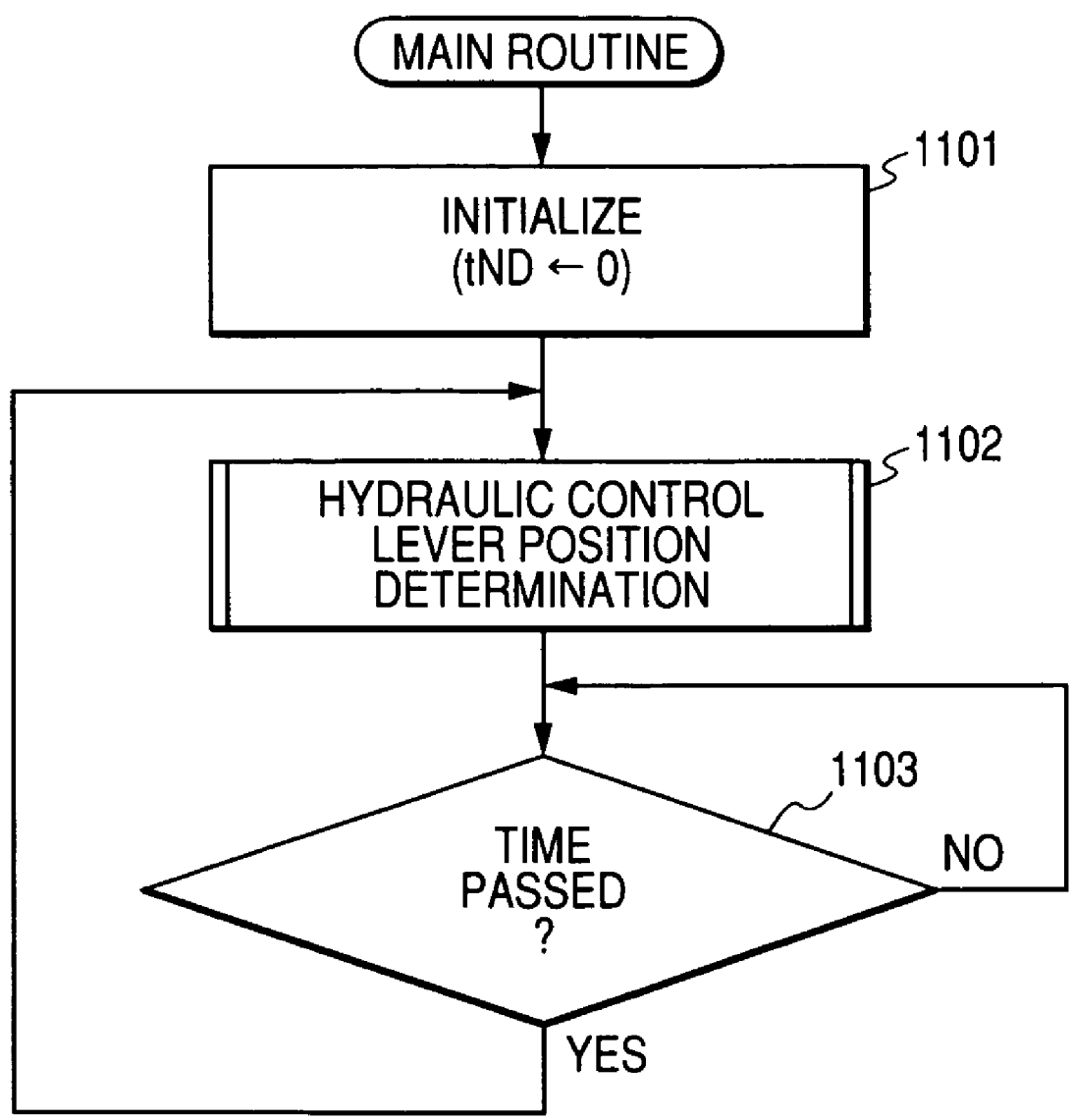
FIG. 15 is a flowchart of a main program to be executed by an automatic transmission control system of the second embodiment of the invention.

Upon supply of electric power to the AT-ECU 30 following turning on of the ignition switch of the automotive vehicle, the AT-ECU 30 initiates the main program, as illustrated in FIG. 15.

Figure 17:
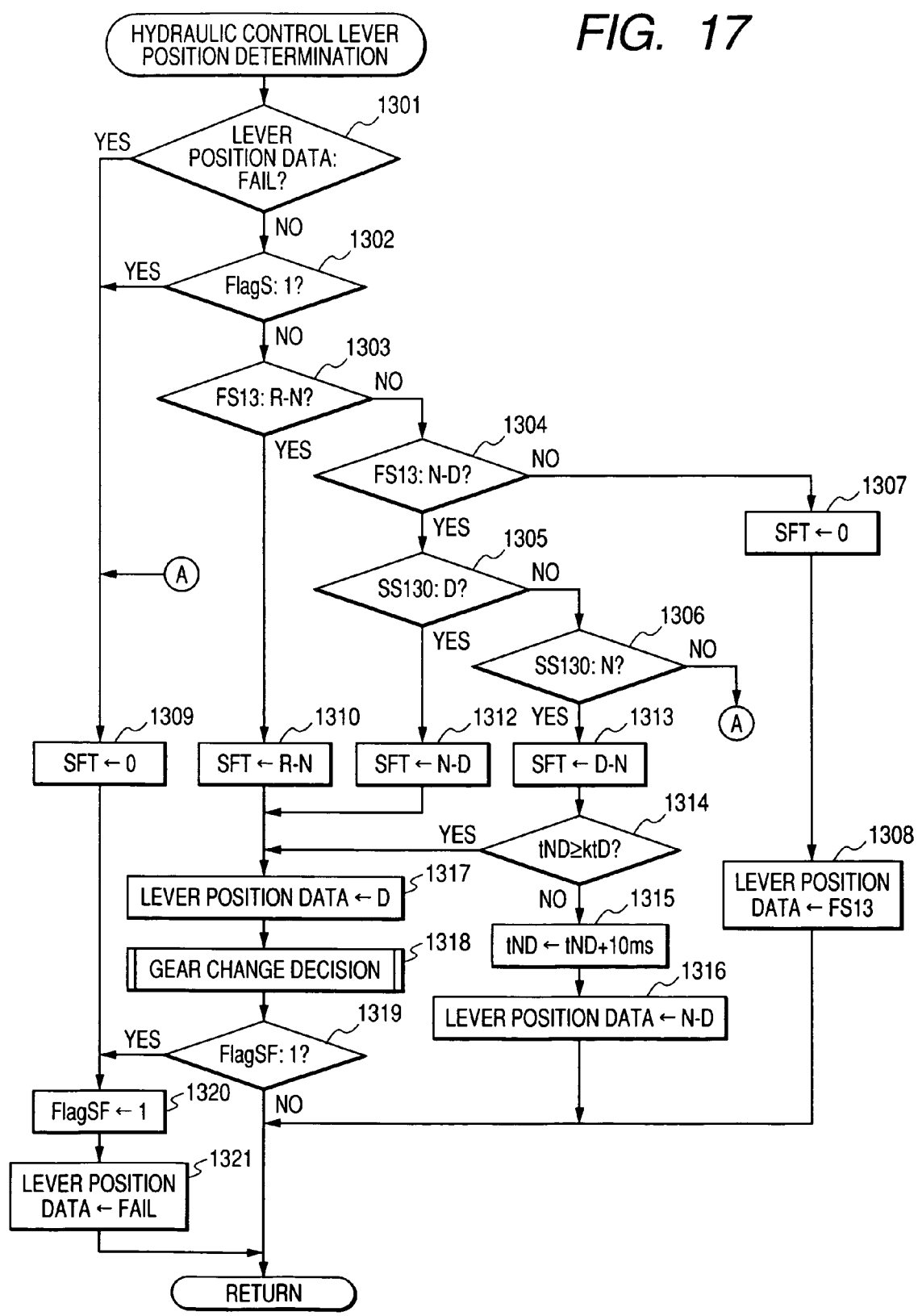
FIG. 17 is a flowchart of a sub-program to be executed in the main program of FIG. 15 to monitor a position of a gear shift lever for hydraulic control of an automatic transmission.

First, in step 1101, flags and a timer value tND, as will be referred to later, are reset to initial values. The routine proceeds to step 1102 wherein a hydraulic control lever position determination, as shown in FIG. 17, is made. The routine proceeds to step 1103 wherein it is determined whether a given period of time (e.g., 10 msec.) has passed or not. If a YES answer is obtained, then the routine returns back to step 1102. Specifically, after the AT-ECU 30 is turned on, the hydraulic control lever position determination, as illustrated in FIG. 17, is made periodically at an interval (e.g., 10 msec.), as measured in step 1103.

Figure 16:
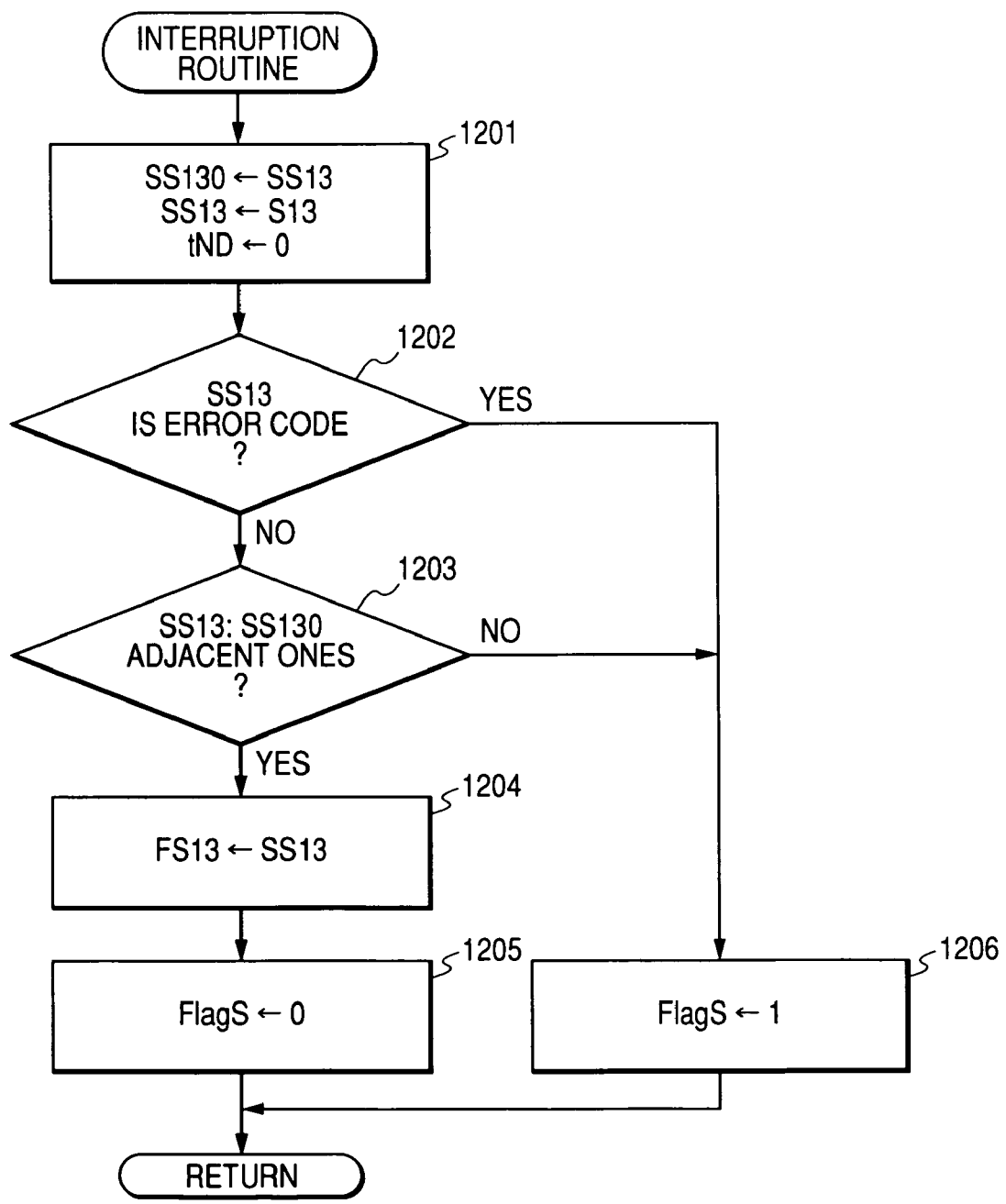
FIG. 16 is a flowchart of a sub-program to be executed by interruption handling in the main program of FIG. 15.

FIG. 16 shows an interruption routine which is initiated each time any one of the outputs of the switches S1, S2, and S3 changes in the logic value in order to detect the failure of the shift lever position sensor 12.

First, in step 1201, the outputs of the switches S1, S2, and S3 are sampled to produce a three-bit code S13 made up a sequence of them. Additionally, a three-bit code which was produced and stored one program cycle earlier as a current three-bit code SS13 is updated as a previous three-bit code SS130, while the three-bit code S13, as produced in this program cycle, is stored as the current three-bit code SS13. Further, the timer value tND is reset.

The routine proceeds to step 1202 wherein the current three-bit code SS13 is an error code "000" or not. If a YES answer is obtained, then the routine proceeds to step 1206 wherein the first failure flag FlagS is set to one (1) meaning that the failure has occurred in the shift lever position sensor 12. The routine then terminates.

Alternatively, if a NO answer is obtained in step 1202, then the routine proceeds to step 1203 wherein the current three-bit code SS13 (i.e., a three-bit code produced after any one of the outputs S1, S2, and S3 changes) is compared with the previous three-bit code SS130 (i.e., a three-bit code produced before such a change) to determine whether they are adjacent ones or not, that is, whether they represent adjacent two of the shift lever positions or not. If a NO answer is obtained, then the routine proceeds to step 1206 wherein the first failure flag FlagS is set to one (1) meaning that the failure has occurred in the shift lever position sensor 12. The routine then terminates.

Alternatively, if a YES answer is obtained in step 1203 meaning that the current three-bit code SS13 and the previous three-bit code SS130 are arrayed adjacent to each other, then the routine proceeds to step 1204 wherein the current three-bit code SS13 is set as a three-bit code FS13. The routine proceeds to step 1205 wherein the first failure flag FlagS is kept at or reset to zero (0) meaning the absence of the failure of the shift lever position sensor 12. The routine then terminates.

FIG. 17 shows the operation as executed in step 1102 of FIG. 15 to determine the position of the gear shift lever 11 and whether the shift lever position sensor 12 is malfunctioning or not.

First, in step 1301, it is determined whether a hydraulic control lever position data, as updated one program cycle earlier, indicates the presence of a sensor failure (i.e., the failure in operation of the shift lever position sensor 12) or not. If a YES answer is obtained, then the routine proceeds to step 1309 wherein an intermediate position parameter SFFT is set to zero (0). The routine proceeds to step 1320 wherein a second failure flag FlagSF is kept at or set to one (1) indicating the presence of the failure of the shift lever position sensor 12. The routine proceeds to step 1321 wherein the hydraulic control lever position data is kept as indicating the presence of the sensor failure. The routine then terminates.

If a NO answer is obtained in step 1301 meaning that the hydraulic control lever position data does not indicates the presence of the sensor failure, then the routine proceeds to step 1302 wherein it is determined whether the first failure flag FlagS, as derived in step 1205 or 1206 of FIG. 16, shows one (1) or not which indicates the presence of the sensor failure. If a YES answer is obtained meaning that the first failure flag FlagS shows one (1), then the routine proceeds to steps 1309, 1320, and 1321 wherein the intermediate position parameter SFT is reset to zero (0), the second failure flag FlagSF is set to one (1), and the hydraulic control lever position data is set as indicating the presence of the sensor failure. The routine then terminates.

Figure 18:
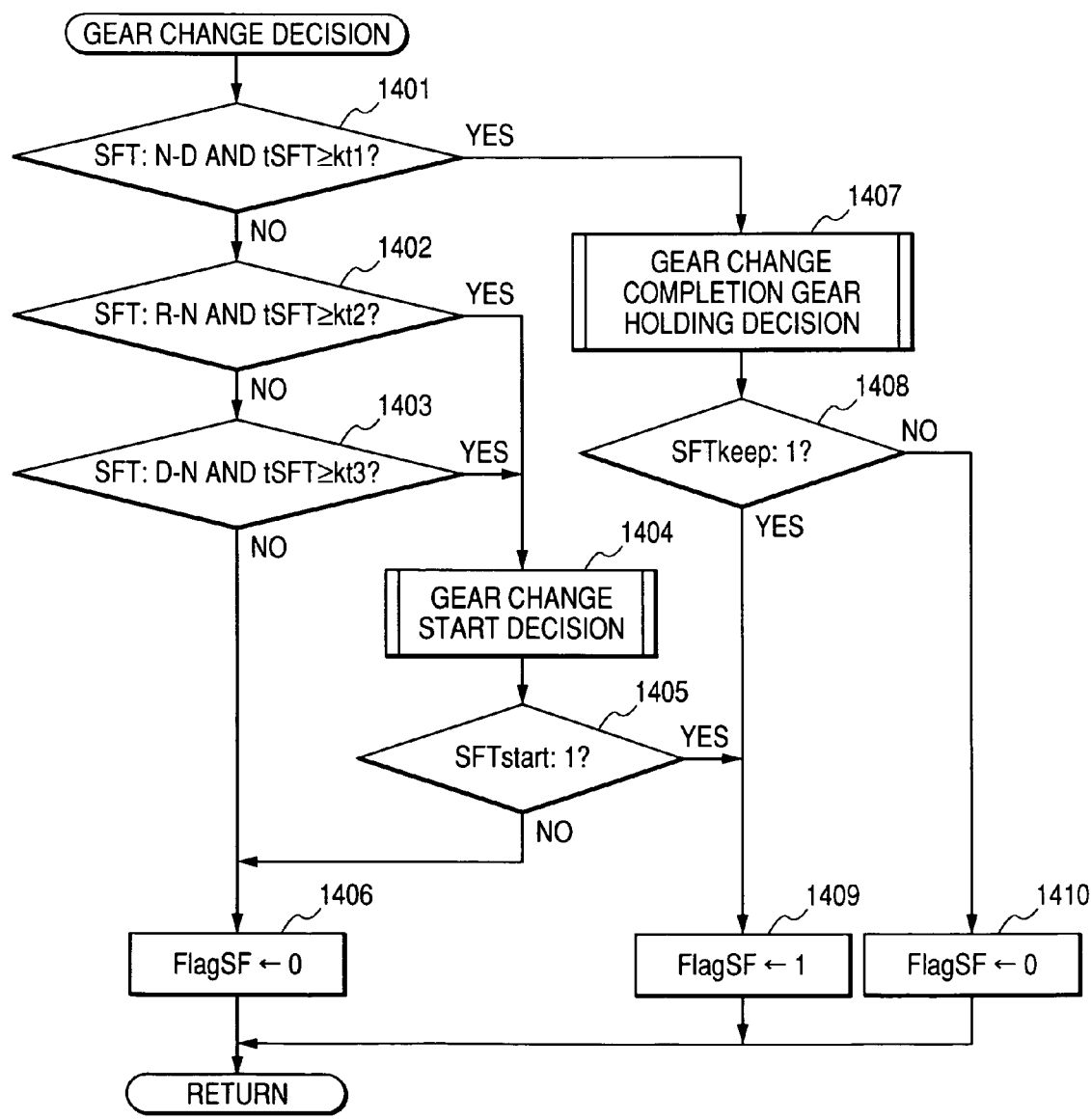
FIG. 18 is a sub-program to be executed in the program of FIG. 17 to monitor a gear change action of an automatic transmission.

If a NO answer is obtained in step 1302 meaning that the failure of the shift lever position sensor 12 is not detected, then the routine proceeds to step 1303 wherein it is determined whether the current lever position three-bit code FS13, as derived in step 1204 of FIG. 16, indicates the R-N position of the gear shift lever 11 or not. If a YES answer is obtained, then the routine proceeds to step 1310 wherein the intermediate position parameter SFT is set to an R-N parameter indicating that the position of the gear shift lever 11 is in the R-N position. The routine proceeds to step 1317 wherein the hydraulic control lever position data is set as indicating the D position of the gear shift lever 11. Specifically, when the current lever position three-bit code FS13 indicates the R-N position of the gear shift lever 11, the AT-ECU 30 views or deems the position of the gear shift lever 11 as being in the D position and performs the deemed D-position hydraulic transmission control. Subsequently, the routine proceeds to step 1318 wherein a gear change decision, as will be described later in FIG. 18, is made to monitor a gear change in the automatic transmission 110, as established by the deemed D-position hydraulic transmission control, to determine whether the shift lever position sensor 12 is failing or not.

If a NO answer is obtained in step 1303 meaning that the current lever position three-bit code FS13 does not indicate the R-N position, then the routine proceeds to step 1304 wherein it is determined whether the current lever position three-bit code FS13 indicates the N-D position of the gear shift lever 11 or not. If a YES answer is obtained, then the routine proceeds to step 1305 wherein it is determined whether the previous three-bit code SS130 indicates the D position or not, that is, whether the gear shift lever 11 has changed from the D to N-D position or not. If a YES answer is obtained, then the routine proceeds to step 1312 wherein the intermediate position parameter SFT is set to an N-D parameter indicating that the gear shift lever 11 has been changed from the D to N-D position. The routine then proceeds to step 1317 wherein the hydraulic control lever position data is set as indicating the D position of the gear shift lever 11. Specifically, when the gear shift lever 11 is determined as having changed from the D to N-D position, the AT-ECU 30 deems the position of the gear shift lever 11 to be in the D position and performs the deemed D-position hydraulic transmission control. Subsequently, the routine proceeds to step 1318 wherein the gear change decision, as will be described later in FIG. 18, is made to monitor a gear change in the automatic transmission 110, as established by the deemed D-position hydraulic transmission control, to determine whether the shift lever position sensor 12 is failing or not.

If a NO answer is obtained in step 1305 meaning that the previous three-bit code SS130 does not indicate the D position, then the routine proceeds to step 1306 wherein it is determined whether the previous three-bit code SS130 indicates the N position or not, that is, whether the gear shift lever 11 has changed from the N to N-D position or not. If a YES answer is obtained, then the routine proceeds to step 1313 wherein the intermediate position parameter SFT is set to an D-N parameter indicating that the gear shift lever 11 has been changed from the N to N-D position. The routine proceeds to step 1314 wherein the timer value tND indicating a time duration for which the gear shift lever 11 is determined as having been changed from the N position to the N-D position and being placed at the N-D position exceeds a given period of time ktD or not, that is, whether, after being changed from the N position, the gear shift lever 11 is determined to be placed at the N-D position for more than the period of time ktD or not. If a NO answer is obtained, then the routine proceeds to step 1315 wherein the timer value tND is incremented by a time equivalent to the cycle (e.g., 10 msec.) in which this program is to be executed. The routine proceeds to step 1316 wherein the hydraulic control lever position data is set as indicating the N-D position of the gear shift lever 11. The routine then terminates.

Specifically, when the gear shift lever 11 is determined as having been changed from the N to N-D position, the AT-ECU 30 disenables the deemed D-position hydraulic transmission control until a period of time (i.e., the time ktD) typically required for the gear shift lever 11 to have been changed from the N-D to D position expires. Afterwards, when the timer value tND has reached the period of time ktD, the routine proceeds to step 1317 wherein the hydraulic control lever position data is set as indicating the D position of the gear shift lever 11 to initiate the deemed D-position hydraulic transmission control. Subsequently, the routine proceeds to step 1318 wherein the gear change decision, as will be described later in FIG. 18, is made to monitor a gear change in the automatic transmission 110, as established by the deemed D-position hydraulic transmission control, to determine whether the shift lever position sensor 12 is failing or not.

After step 1318, the routine proceeds to step 1319 wherein it is determined whether the second failure flag FlagSF, as set in FIG. 18, is one (1) or not which indicates the presence of the failure of the shift lever position sensor 12. If a NO answer is obtained, then the routine terminates. Alternatively, if a YES answer is obtained, then the routine proceeds to steps 1320 and 1321 wherein the second failure flag FlagSF is kept at one (1), and the hydraulic control lever position data is set as indicating the presence of the sensor failure. The routine then terminates.

If a NO answer is obtained in step 1304 meaning that the current lever position three-bit code FS13 indicate neither of the R-N and N-D positions, then the routine proceeds to step 1307 wherein the intermediate position parameter SFT is set to zero (0). The routine proceeds to step 1308 wherein the hydraulic control lever position data is provided by the current lever position three-bit code FS13. The routine then terminates.

If a NO answer is obtained in step 1306 meaning that the gear shift lever 11 has been changed to the N-D position from one other than D and N positions, which cannot occur at all, then the routine proceeds to steps 1309, 1320, and 1321 wherein the intermediate position parameter SFT is reset to zero (0), the second failure flag FlagSF is set to one (1), and the hydraulic control lever position data is set as indicating the presence of the sensor failure. The routine then terminates.

FIG. 18 shows a sub-routine to be executed in step 1318 of FIG. 17 to monitor a gear change in the automatic transmission 110.

First, in step 1401, it is determined whether the intermediate position parameter SFT is the N-D parameter or not which indicates that the gear shift lever 11 has been shifted from the D to N-D position. Additionally, an intermediate position duration timer value tSFT indicating a period of time for which the gear shift lever 11 is determined to be in the N-D position is greater than a time kt1 or not which is required to determine whether a gear change of the automatic transmission 110 has been completed in the deemed D-position hydraulic transmission control to hold a gear selected by a shift schedule or not.

Figure 20:
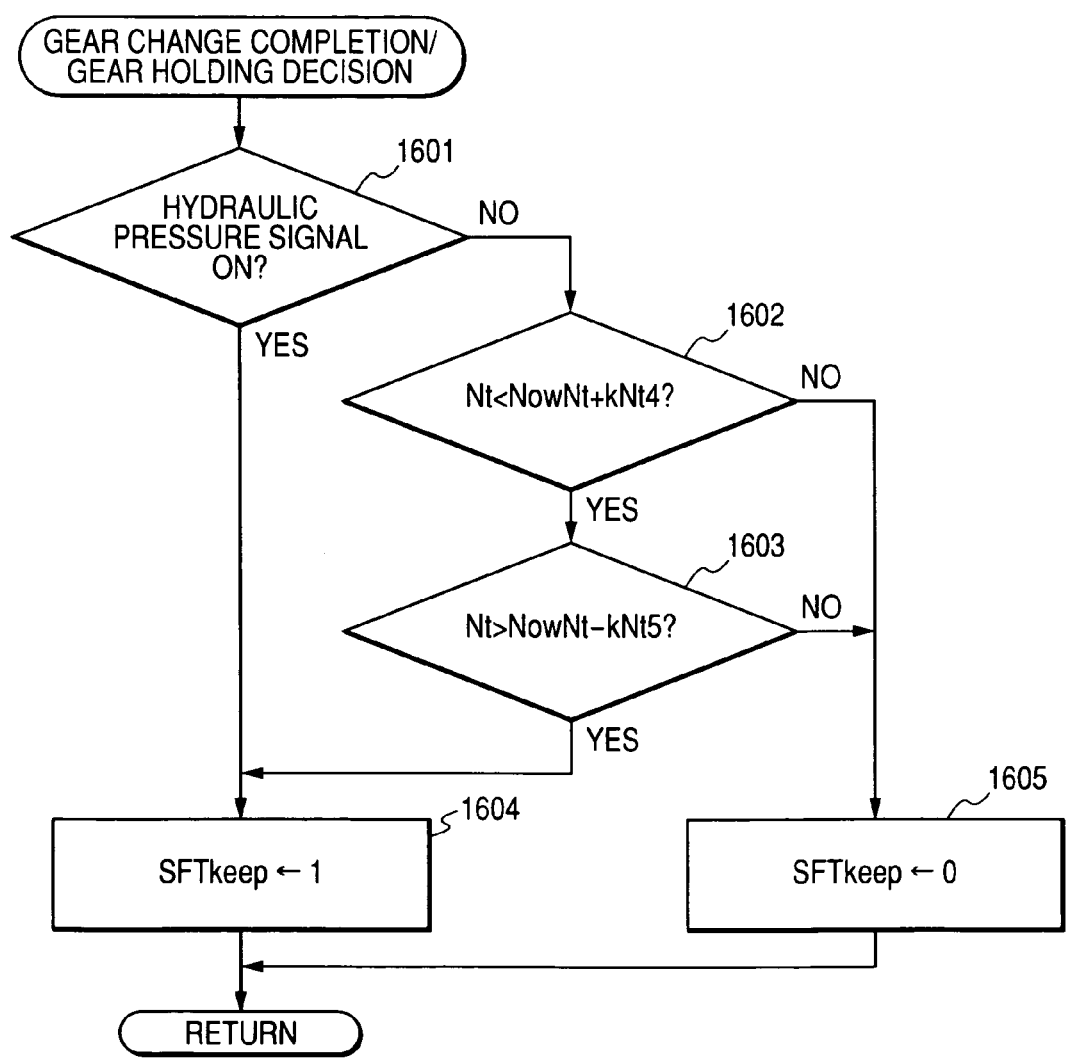
FIG. 20 is a sub-program to be executed in the program of FIG. 18 to monitor the completion or holding of a gear change of an automatic transmission.

If a YES answer is obtained in step 1401, then the routine proceeds to step 1407 wherein a gear change completion/gear holding decision, as will be discussed later in FIG. 20, is made to determine whether a gear change of the automatic transmission 110 has been completed under the deemed D-position hydraulic transmission control to keep or hold a selected gear or not. The routine proceeds to step 1408 wherein it is determined whether a gear holding flag SFTkeep shows one (1) or not which indicates that the preselected gear is held. If a YES answer is obtained meaning that the preselected gear is determined to be held in the N-D position where the preselected gear is not to be held normally, then the routine proceeds to step 1409 wherein second failure flag FlagSF is set to one (1) indicating the presence of the failure of the shift lever position sensor 12. The routine then terminates. Alternatively, if a NO answer is obtained in step 1408 meaning that the gear holding flag SFTkeep shows zero (0), then the routine proceeds to step 1410 wherein second failure flag FlagSF is set to zero (0) indicating the absence of the failure of the shift lever position sensor 12. The routine then terminates.

Figure 19:
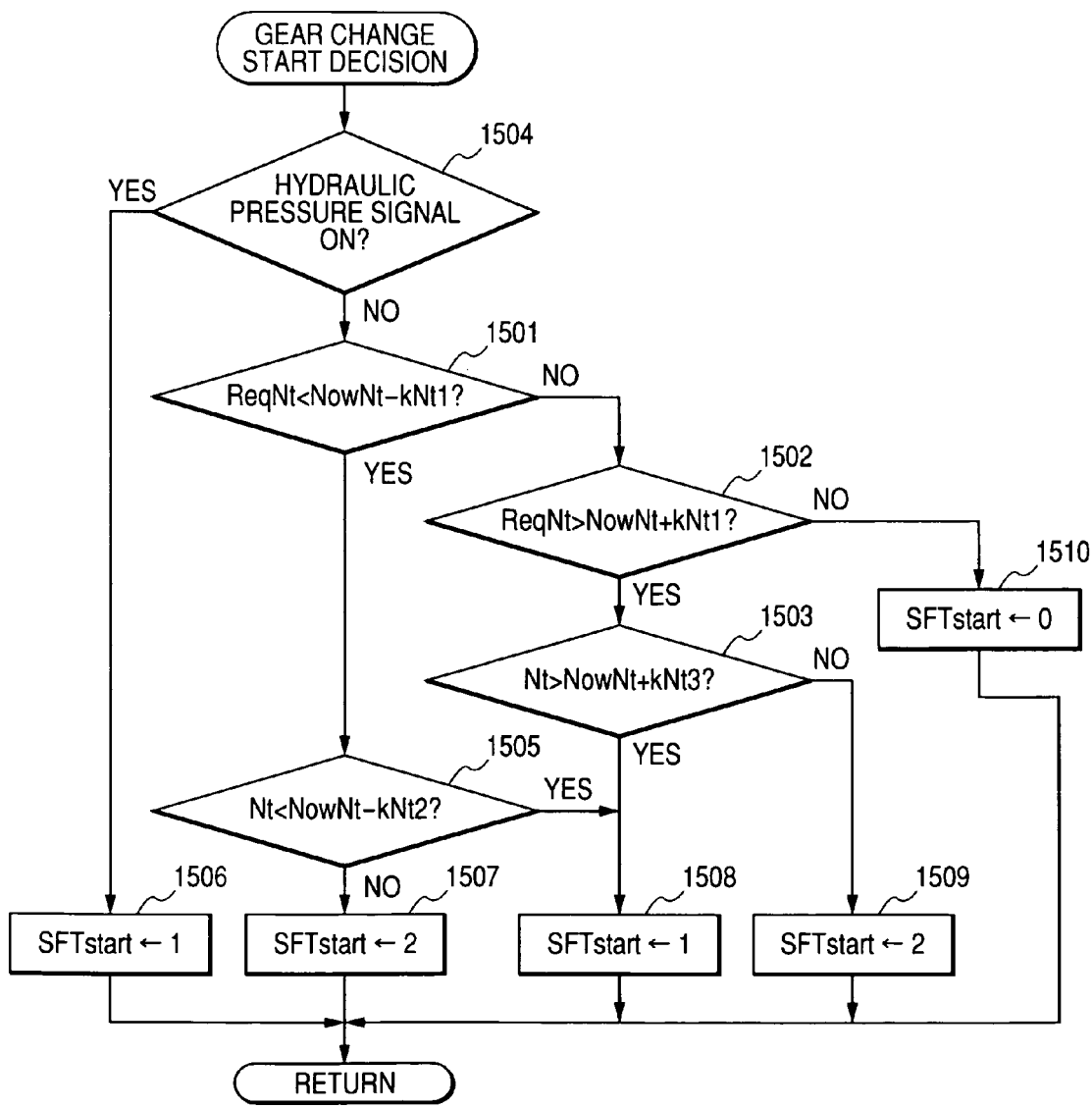
FIG. 19 is a sub-program to be executed in the program of FIG. 18 to monitor the start of a gear change action of an automatic transmission.

If a NO answer is obtained in step 1401, then the routine proceeds to step 1402 wherein it is determined whether the intermediate position parameter SFT is the R-N parameter or not, and whether the intermediate position duration timer value tSFT indicating a period of time for which the gear shift lever 11 is determined to be in the R-N position is greater than a time kt2 or not which is required to determine whether a gear change of the automatic transmission 110 has been initiated under the deemed D-position hydraulic transmission control or not. If a YES answer is obtained in step 1402, then the routine proceeds to step 1404 wherein a gear change initiation decision, as illustrated in FIG. 19 in detail, is made to determine whether a gear change has been initiated under the deemed D-position hydraulic transmission control or not. Subsequently, the routine proceeds to step 1405 wherein it is determined whether a gear change start flag SFTstart is one (1) or not which indicates that a gear change of the automatic transmission 110 has been initiated. If a YES answer is obtained, then the routine proceeds to step 1409 wherein the second failure flag FlagSF is set to one (1) indicating the presence of the failure of the shift lever position sensor 12. The routine then terminates. Alternatively, if a NO answer is obtained in step 1405 meaning that the gear change start flag SFTstart is zero (0), then the routine proceeds to step 1406 wherein the second failure flag FlagSF is set to zero (0) indicating the absence of the sensor failure. The routine then terminates.

If a NO answer is obtained in step 1402, then the routine proceeds to step 1403 wherein it is determined whether the intermediate position parameter SFT is the D-N parameter or not which indicates that the gear shift lever 11 is determined to have been changed from the N to N-D position, and whether the intermediate position duration timer value tSFT indicating a period of time for which the gear shift lever 11 is determined to be in the R-N position is greater than a time kt3 or not which is required to determine whether a gear change of the automatic transmission 110 has been initiated under the deemed D-position hydraulic transmission control or not.

If a YES answer is obtained in step 1403, then the routine proceeds to step 1404 wherein the gear change initiation decision, as illustrated in FIG. 19 in detail, is made to determine whether a gear change has been initiated under the deemed D-position hydraulic transmission control or not. Subsequently, the routine proceeds to step 1405 wherein it is determined whether the gear change start flag SFTstart is one (1) or not which indicates that the gear change of the automatic transmission 110 has been initiated. If a YES answer is obtained in step 1405 meaning that the gear change is determined to have been initiated in the D-N position where the gear change could not happen normally, then the routine proceeds to step 1409 wherein the second failure flag FlagSF is set to one (1) indicating the presence of the failure of the shift lever position sensor 12. The routine then terminates. Alternatively, if a NO answer is obtained in step 1405 meaning that the gear change start flag SFTstart is zero (0), then the routine proceeds to step 1406 wherein the second failure flag FlagSF is set to zero (0) indicating the absence of the sensor failure. The routine then terminates.

If a NO answer is obtained in step 1403, then the routine proceeds to step 1406 wherein the second failure flag FlagSF is set to zero (0) indicating the absence of the sensor failure. The routine then terminates.

FIG. 19 shows a sub-routine to be executed in step 1404 in FIG. 18 to determine whether the gear change has been initiated in the automatic transmission 110 or not.

First, in step 1504, it is determined whether an output(s) of the hydraulic pressure sensor(s) (or the hydraulic pressure switch(es)) indicating the hydraulic pressure(s) acting on one(s) of the frictional elements of the automatic transmission 110 which is to be placed in engagement (also called an on-coming clutch) is in an on-level or not which represents that the one of the frictional elements has been actually engaged. If a YES answer is obtained concluding that the gear change has been initiated in the automatic transmission 110 by the deemed D-position hydraulic transmission control, then the routine proceeds to step 1506 wherein the gear change start flag SFTstart is set to one (1) which indicates that the gear change has been started in the automatic transmission 110.

If a NO answer is obtained in step 1504 meaning that the outputs of the hydraulic pressure sensors are in an off-level, then the routine proceeds to step 1501 wherein it is determined whether an input shaft speed ReqNt of the automatic transmission 110 (i.e., the speed of the output shaft 140 of the torque converter 120) estimated to be developed upon completion of the gear change under the deemed D-position hydraulic transmission control is lower than an input shaft speed NowNt that is the input shaft speed Nt developed at the start of the gear change (i.e., the start of the deemed D-position hydraulic transmission control) by more than a given value kNt1 or not. Note that the input shaft speed ReqNt may be determined in a known manner using the current speed of the vehicle and the gear ratio of the selected gear of the automatic transmission 110. If a NO answer is obtained in step 1501, then the routine proceeds to step 1502 wherein it is determined whether the input shaft speed ReqNt of the automatic transmission 110 is higher than the input shaft speed NowNt by more than the given value kNt1 or not. If NO answers are obtained both in steps 1501 and 1502 meaning that the estimated input shaft speed ReqNt lies within a range of the input shaft speed NowNt±the value kNt1, it is concluded that it is impossible to determine whether the gear change has been initiated by the deemed D-position hydraulic transmission control or not. The routine then proceeds to step 1510 wherein the gear change start flag SFTstart is reset to zero (0) and terminates.

If a YES answer is obtained in step 1502 meaning that the input shaft speed ReqNt of the automatic transmission 110 is higher than the input shaft speed NowNt by more than the given value kNt1, then the routine proceeds to step 1503 wherein it is determined whether a current input shaft speed Nt, as measured by the input shaft speed sensor 28, is higher than the input shaft speed NowNt developed at the start of the gear change by more than a given value kNt3 or not. If a YES answer is obtained meaning that the gear change has been initiated by the deemed D-position hydraulic transmission control, then the routine proceeds to step 1508 wherein the gear change start flag SFTstart is set to one (1). The routine then terminates. Alternatively, if a NO answer is obtained in step 1503 meaning that it is impossible to confirm the gear change to be developed by the deemed D-position hydraulic transmission control, then the routine proceeds to step 1509 wherein the gear change start flag SFTstart is set to two (2).

If a YES answer is obtained in step 1501 meaning that the input shaft speed ReqNt is lower than the input shaft speed NowNt by more than the value kNt1, then the routine proceeds to step 1505 wherein it is determined whether the current input shaft speed Nt, as measured by the input shaft speed sensor 28, is lower than the input shaft speed NowNt developed at the start of the gear change by more than a given value kNt2 or not. If a YES answer is obtained meaning that the gear change has been initiated by the deemed D-position hydraulic transmission control, then the routine proceeds to step 1508 wherein the gear change start flag SFTstart is set to one (1). The routine then terminates. Alternatively, if a NO answer is obtained in step 1505 meaning that it is impossible to confirm the gear change to be developed by the deemed D-position hydraulic transmission control, then the routine proceeds to step 1507 wherein the gear change start flag SFTstart is set to two (2). The routine then terminates.

FIG. 20 shows a sub-routine to be executed in step 1407 of FIG. 18 to make the gear change completion/gear holding decision.

First, in step 1601, it is determined whether it is determined whether any of the outputs of the hydraulic pressure sensors indicating the hydraulic pressures acting on the frictional elements of the automatic transmission 110 which are to be placed in disengagement is in an on-level or not which represents that any of the frictional elements is being engaged. If a YES answer is obtained meaning that the gear of the automatic transmission 110 selected in the deemed D-position hydraulic transmission control is determined to be held as it is, then the routine proceeds to step 1604 wherein the gear holding flag SFTkeep is set to one (1). The routine then terminates. Specifically, the fact that a YES answer is obtained in step 1401, that is, that the output of the shift lever sensor 12 represents that the gear shift lever 11 has been shifted from the D to N-D position means that the gear of the automatic transmission 110 is in the neutral range in which all the frictional elements of the automatic transmission 110 are placed in disengagement. However, if a YES answer is obtained in step 1601, it means that any of the frictional elements of the automatic transmission 110 is in engagement, that is, that the gear shift lever 11 is not actually in the N-D position (see the rightmost column of the table of FIG. 13(*c*)). This represents that the shift lever position sensor 12 is failing in operation.

Alternatively, if a NO answer is obtained in step 1601, then the routine proceeds to step 1602 wherein it is determined whether the current input shaft speed Nt, as measured by the input shaft speed sensor 28, is lower than an upper limit (=NowNt+kNt4) of a variation range permissible in detecting the input shaft speed NowNt developed at the start of the gear change or not. If a YES answer is obtained, then the routine proceeds to step 1603 wherein it is determined whether the current input shaft speed Nt, as measured by the input shaft speed sensor 28, is higher than a lower limit (=NowNt−kNt5) of the variation range permissible in detecting the input shaft speed NowNt or not.

If YES answers are obtained both in steps 1602 and 1603 meaning that the current input shaft speed Nt lies within the permissible variation range of the input shaft speed NowNt, it is concluded that the preselected gear is held by the deemed D-position hydraulic transmission control (i.e., the position of the gear shift lever 11 is now placed in the D position). The routine then proceeds to step 1604 wherein the gear holding flag SFTkeep is set to one (1) and terminates. If a NO answer is obtained in either of steps 1602 and 1603 meaning that the deemed D-position hydraulic transmission control has been performed, but the preselected gear is not held (i.e., the position of the gear shift lever 11 is in a position other than the D position), then the routine proceeds to step 1605 wherein the gear holding flag SFTkeep is set to zero (0) and terminates.

Figure 21:
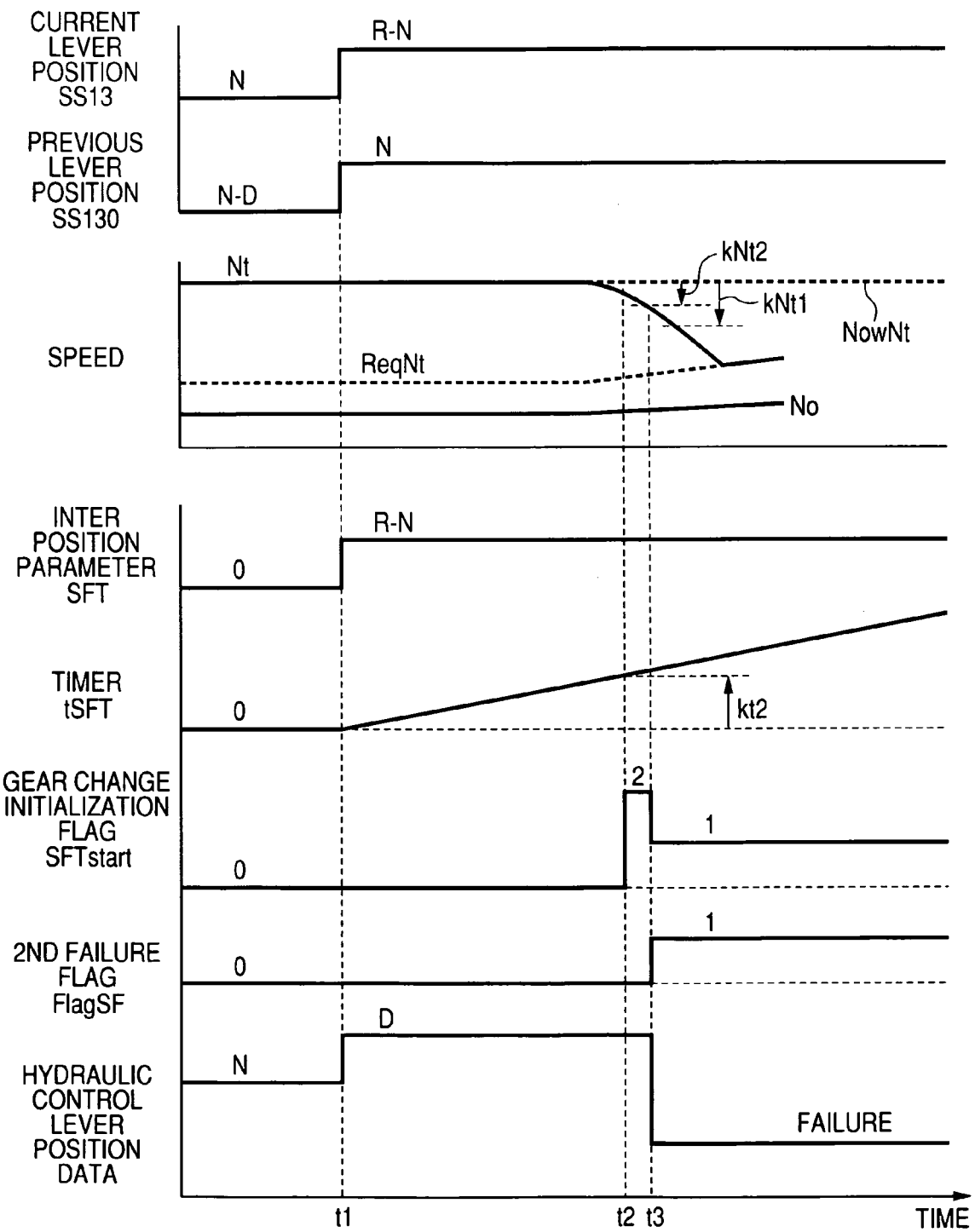
FIG. 21 is a time chart which shows operations of an automatic transmission control system in a case where a gear shift lever is determined to be shifted from N to N-R position.

The above control of the automatic transmission 110 will be discussed with reference to a time chart of FIG. 21. The time chart illustrates for the case where the position of the gear shift lever 11, as monitored by the shift lever position sensor 12, has been changed from the N-D to N position and to the R-N position sequentially (see current lever position three-bit code SS13 and the previous lever position three-bit code SS130).

At time t1 when the position of the gear shift lever 11, as represented by the current lever position three-bit code SS13, changes from the N position to the R-N position, the intermediate position parameter SFT changes from zero (0) to the R-N parameter. This causes the hydraulic control lever position data to be set as indicating the D position of the gear shift lever 11. The deemed D-position hydraulic transmission control is, thus, initiated immediately. Simultaneously, the intermediate position duration timer value tSFT starts to be counted up.

If the current lever position three-bit code SS13 represents the R-N position of the gear shift lever 11 in error, and an actual position thereof is the D position, execution of the deemed D-position hydraulic transmission control will initiate a gear shifting (i.e., a gear changing) of the automatic transmission 110. A determination of whether the gear shift lever 11 is actually placed in the D position or not, that is, whether the shift lever position sensor 12 is failing or not may, therefore, be made by determining whether the gear changing has been initiated or not. Usually, a time lag is created between the start of the deemed D-position hydraulic transmission control and actual start of the gear changing of the automatic transmission 110. Therefore, the elapsed time from the start of the deemed D-position hydraulic transmission control is counted using the intermediate position duration timer value tSFT. At time t2 when the timer value tSFT reaches the time kt2 equivalent to the time lag of the deemed D-position hydraulic transmission control, the determination of whether the gear change of the automatic transmission 110 has been initiated or not starts to be made.

Immediately after such a gear change initiation determination, a selected gear of the automatic transmission 110 is not yet established completely. The gear change start flag SFTstart is, thus, set to two (2) indicating such an event. Afterwards, as the gear changing actually continues, the input shaft speed Nt of the automatic transmission 110 decreases. When the input shaft speed Nt drops below the input shaft speed NowNt, as developed at the start of the deemed D-position hydraulic transmission control, by the value kNt2 or more (time t3), the AT-ECU 30 determines that the gear change has been initiated and sets the gear change start flag SFTstart to one (1).

After time t1, the current lever position three-bit code SS13 denotes, as described above, that the gear shift lever 11 is in the R-N position. The fact that the gear change has been initiated by the deemed D-position hydraulic transmission control, therefore, means that the gear shift lever 11 is actually placed in the D position. This represents that the shift lever position sensor 12 is now malfunctioning. The AT-ECU 30, thus, sets the second failure flag FlagSF to one (1) and the hydraulic control lever position data as indicating the presence of the sensor failure at time t3 when the gear change start flag SFTstart is set to one (1).

When the hydraulic control lever position data is provided as indicating the presence of the sensor failure, the AT-ECU 30 performs a fail-safe operation which controls predetermined some of the hydraulic valves of the automatic transmission 110 (see FIG. 10) so as to establish a preselected gear or speed (e.g., a third-speed gear) in the D range. This secures running of the vehicle in the event of the failure of the shift lever position sensor 12.

As apparent from the above discussion, the automatic transmission control system of this embodiment works to perform the deemed D-position hydraulic transmission control whenever the gear shift lever 11 is determined to be placed in the R-N or N-D range, whether it is erroneous or correct. This avoids an unwanted case where the failure of the shift lever position sensor 12 results in the impossibility of operating the automatic transmission 110 to run the vehicle. Specifically, in the event of the failure of the shift lever position sensor 12, shifting the gear shift lever 11 to the D position enables the vehicle to run.

When the three-bit code made up of outputs of the switches S1, S2, and S3 is an erroneous code "000" or the position of the gear shift lever 11, as represented by the three-bit code produced in the latest program cycle, is not adjacent to that, as represented by the three-bit code produced in the previous program cycle, the AT-ECU 30 determines that the shift lever position sensor 12 is failing and controls the hydraulic pressures in the automatic transmission 110 so as to establish a preselected gear (speed). Therefore, even when the gear shift lever 11 is determined to be in a position other than the R-N or N-D position, shifting the gear shift lever 11 to the D position enables the vehicle to run in the event of the failure of the shift lever position sensor 12.

The AT-ECU 30 works to perform the deemed D-position hydraulic transmission control in the case where the gear shift lever 11 is determined to be in the R-N or N-D position, but however, may be designed to perform the deemed D-position hydraulic transmission control in other positions excluding the R position of the gear shift lever 11.

The third embodiment of the invention will be described below.

Figure 22:
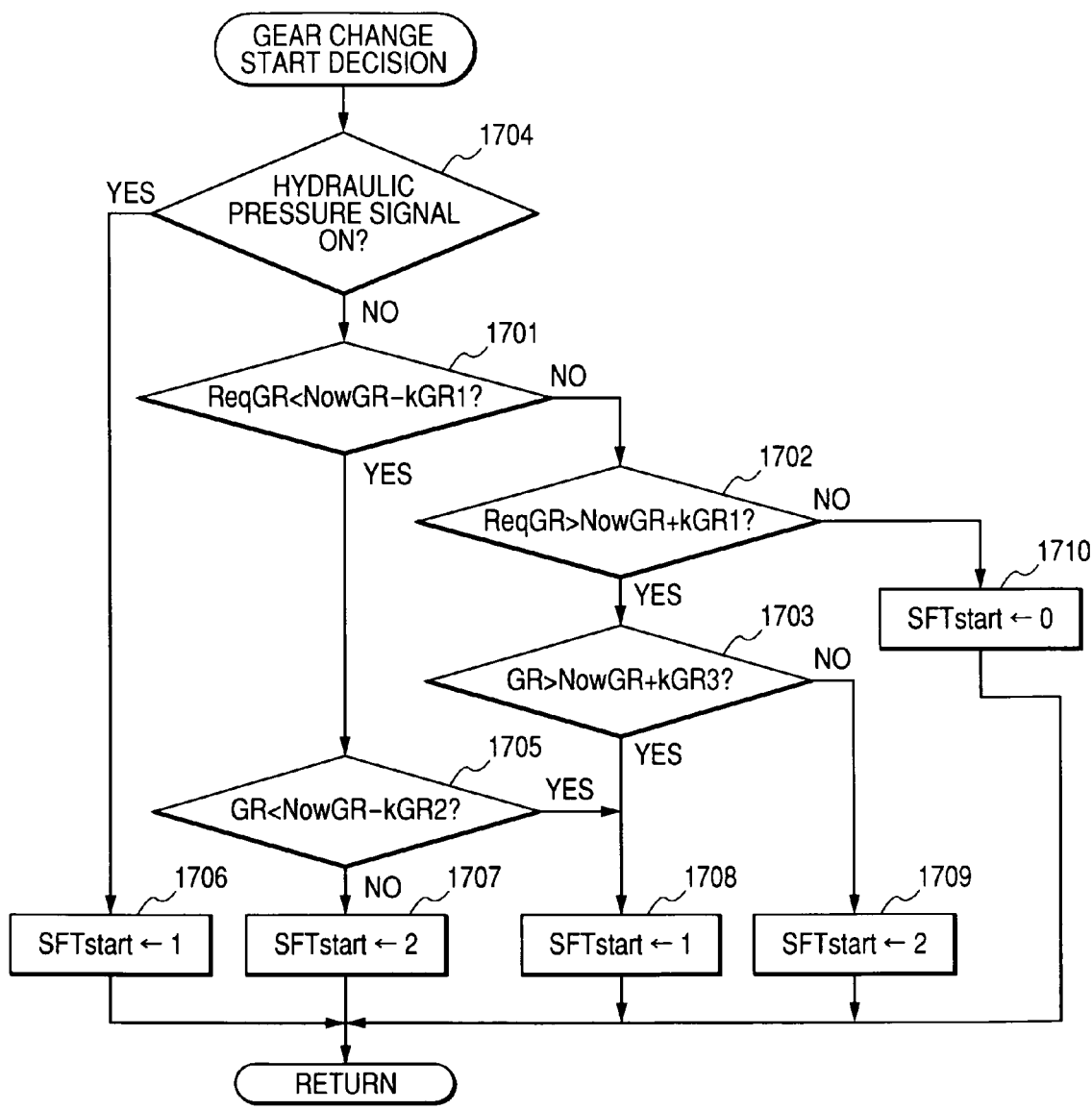
FIG. 22 is a modification of a sub-program in FIG. 19 to be executed in the program of FIG. 18 to monitor the start of a gear change action of an automatic transmission.
Figure 23:
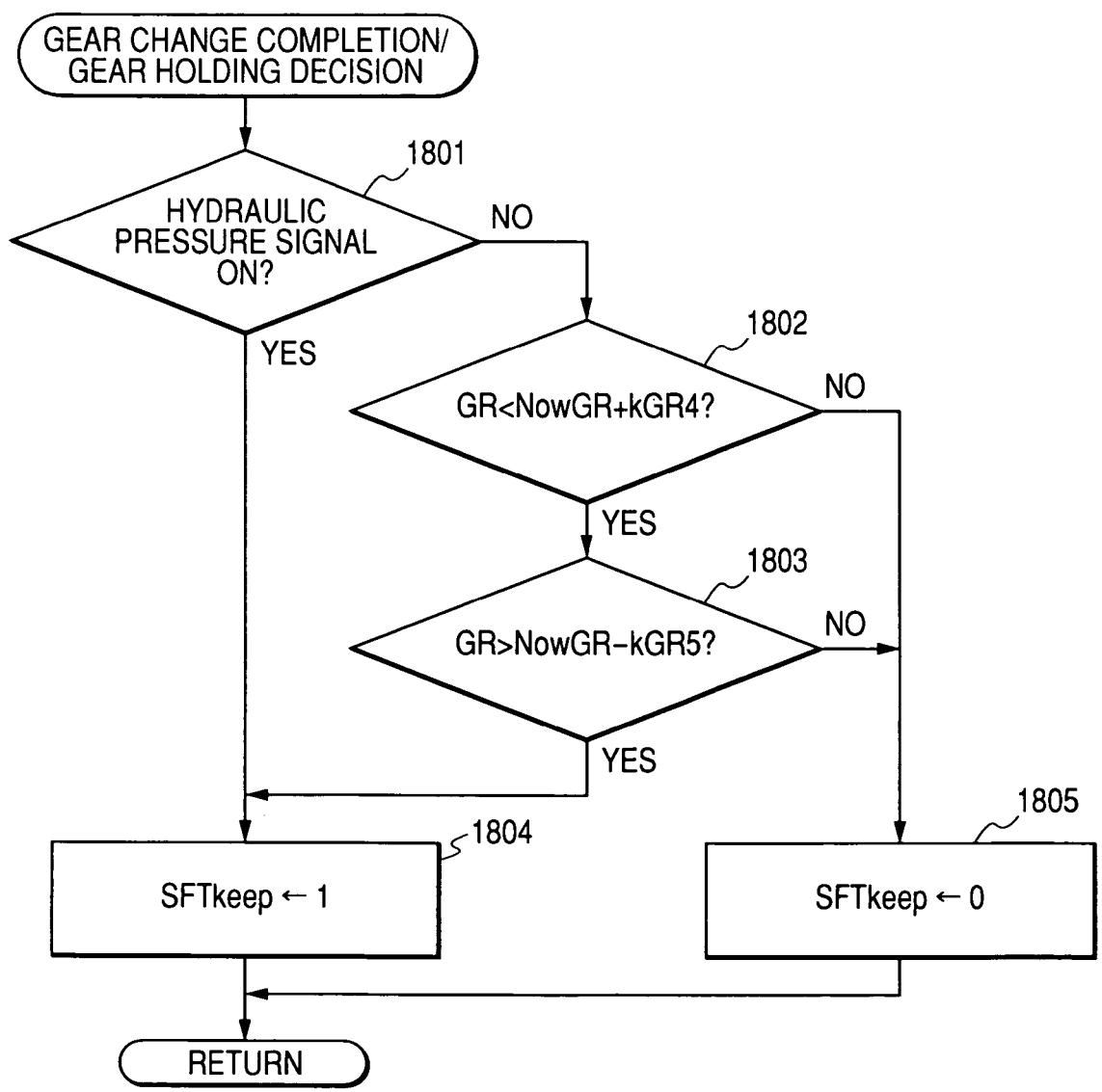
FIG. 23 is a modification of a sub-program in FIG. 20 to be executed in the program of FIG. 18 to monitor the completion or holding of a gear change of an automatic transmission.

FIGS. 22 and 23 show modifications of the gear change initiation decision and the gear change completion/gear holding decision, as made in the programs of FIGS. 19 and 20.

While the AT-ECU 30 of the second embodiment works to observe a gear change action (i.e., initiation of a gear change or holding of a selected gear) of the automatic transmission 110 when the deemed D-position hydraulic transmission control is performed by monitoring a change in the input shaft speed Nt, the AT-ECU 30 of this embodiment is designed to achieve such an observation using a change in gear ratio GR of the automatic transmission 110. The gear ratio GR is mathematically determined in the AT-ECU 30 by a ratio of the input shaft speed Nt, as measured by the input shaft speed sensor 28, to the output shaft speed No, as measured by the output shaft speed sensor 29 (i.e., GR=Nt/No).

The AT-ECU 30 performs the programs illustrated in FIGS. 22 and 23 in stead of those illustrated in FIGS. 19 and 20.

After entering the program of FIG. 22, the routine proceeds to step 1704 wherein it is determined whether an output(s) of the hydraulic pressure sensor(s) (or the hydraulic pressure switch(es)) indicating the hydraulic pressure(s) acting on one(s) of the frictional elements of the automatic transmission 110 which is to be placed in engagement (also called an on-coming clutch) is in an on-level or not which represents that the one of the frictional elements has been actually engaged. If a YES answer is obtained concluding that the gear change has been initiated in the automatic transmission 110 by the deemed D-position hydraulic transmission control, then the routine proceeds to step 1706 wherein the gear change start flag SFTstart is set to one (1) which indicates that the gear change has been started in the automatic transmission 110. The routine then terminates.

If a NO answer is obtained in step 1704 meaning that the output of the hydraulic pressure sensor is in an off-level, then the routine proceeds to step 1701 wherein it is determined whether a gear ratio ReqGR of a target gear (i.e., speed) of the automatic transmission 110 required or selected in the deemed D-position hydraulic transmission control is smaller than a gear ratio NowGR of a gear of the automatic transmission 110 selected at the start of the gear change (i.e., the start of the deemed D-position hydraulic transmission control) by a given value kGR1 or not. If a NO answer is obtained in step 1701, then the routine proceeds to step 1702 wherein the gear ratio ReqGR of the target gear of the automatic transmission 110 is higher than the gear ratio NowGR plus the given value kGR1 or not. If a NO answer is obtained meaning that the gear ratio ReqGR of the target gear is near the gear ratio NowGR, that is, lies within a range of NowGR±kGR1, it is concluded that it is impossible to determine whether the gear change has been initiated by the deemed D-position hydraulic transmission control or not. The routine then proceeds to step 1710 wherein the gear change start flag SFTstart is reset to zero (0) and terminates.

If a YES answer is obtained in step 1702 meaning that the gear ratio ReqGR of the target gear of the automatic transmission 110 is higher than the gear ratio NowGR selected at the start of the deemed D-position hydraulic transmission control by a given value kGR1, then the routine proceeds to step 1703 wherein it is determined whether an actual gear ratio GR of a currently selected gear of the automatic transmission 110, as calculated using the output of the input shaft speed sensor 28 and output shaft sensor 29, is higher than the gear ratio NowGR of the gear at the start of the gear change by more than a given value kGR3 or not. If a YES answer is obtained meaning that the gear change has been initiated by the deemed D-position hydraulic transmission control, then the routine proceeds to step 1708 wherein the gear change start flag SFTstart is set to one (1). The routine then terminates. Alternatively, if a NO answer is obtained in step 1703 meaning that it is impossible to confirm the gear change to be developed by the deemed D-position hydraulic transmission control, then the routine proceeds to step 1709 wherein the gear change start flag SFTstart is set to two (2).

If a YES answer is obtained in step 1701 meaning that the gear ratio ReqGR of the target gear of the automatic transmission 110 is smaller than the gear ratio NowGR at the start of the gear change by the value kGR1 or more, then the routine proceeds to step 1705 wherein it is determined whether the actual gear ratio GR of the currently selected gear of the automatic transmission 110 is lower than the gear ratio NowGR of the gear at the start of the gear change by more than a given value kGR2 or not. If a YES answer is obtained meaning that the gear change has been initiated by the deemed D-position hydraulic transmission control, then the routine proceeds to step 1708 wherein the gear change start flag SFTstart is set to one (1). The routine then terminates. Alternatively, if a NO answer is obtained in step 1705 meaning that it is impossible to confirm the gear change to be developed by the deemed D-position hydraulic transmission control, then the routine proceeds to step 1707 wherein the gear change start flag SFTstart is set to two (2). The routine then terminates.

The sub-routine of FIG. 23 is to be executed in step 1407 of FIG. 18 to make the gear change completion/gear holding decision.

First, in step 1801, it is determined whether it is determined whether any of the outputs of the hydraulic pressure sensors indicating the hydraulic pressures acting on the frictional elements of the automatic transmission 110 which are to be placed in disengagement is in an on-level or not which represents that any of the frictional elements is being engaged. If a YES answer is obtained meaning that the gear of the automatic transmission 110 selected in the deemed D-position hydraulic transmission control is determined to be held as it is, then the routine proceeds to step 1804 wherein the gear holding flag SFTkeep is set to one (1). The routine then terminates. Specifically, the fact that a YES answer is obtained in step 1401, that is, that the output of the shift lever sensor 12 represents that the gear shift lever 11 has been shifted from the D to N-D position means that the gear of the automatic transmission 110 is in the neutral range in which all the frictional elements of the automatic transmission 110 are placed in disengagement. However, if a YES answer is obtained in step 1801, it means that any of the frictional elements of the automatic transmission 110 is in engagement, that is, that the gear shift lever 11 is not actually in the N-D position (see the rightmost column of the table of FIG. 13(c)). This represents that the shift lever position sensor 12 is failing in operation.

Alternatively, if a NO answer is obtained in step 1801, then the routine proceeds to step 1802 wherein it is determined whether the actual gear ratio GR of the currently selected gear of the automatic transmission 110 is lower than an upper limit (=NowGR+kGR4) of a variation range permissible in detecting the gear ratio NowGR of the gear at the start of the gear change or not. If a YES answer is obtained, then the routine proceeds to step 1803 wherein it is determined whether the actual gear ratio GR of the currently selected gear of the automatic transmission 110 is higher than a lower limit (=NowGR−kGR5) of the variation range permissible in detecting the gear ratio NowGR of the gear at the start of the gear change or not If YES answers are obtained both in steps 1802 and 1803 meaning that the actual gear ratio GR lies within the permissible variation range in detecting the gear ratio NowGR, it is concluded that the preselected gear is held by the deemed D-position hydraulic transmission control (i.e., the position of the gear shift lever 11 is now placed in the D position, that is, the gear range of the automatic transmission 110 is placed in the D range). The routine then proceeds to step 1804 wherein the gear holding flag SFTkeep is set to one (1) and terminates. If a NO answer is obtained in either of steps 1802 and 1803 meaning that the deemed D-position hydraulic transmission control has been performed, but the preselected gear is not held (i.e., the position of the gear shift lever 11 is in a position other than the D position, that is, the gear range of the automatic transmission 110 is not in a range other than the D range), then the routine proceeds to step 1805 wherein the gear holding flag SFTkeep is set to zero (0) and terminates.

The automatic transmission 110 is, as described already, designed to be switchable among four gear ranges: the P, R, N, and D ranges following an action of the gear shift lever 11, but however, the invention may be used with more than four-gear range automatic transmissions. In this case, the shift lever position sensor 12 is preferably designed to have five switches four of which are used to make a four-bit binary code as representing the position of the gear shift lever 11.

Each of the switches S1, S2, and S3 is of a contact type, but may alternatively be of a non-contact type such as a Hall element, a magnetic sensor, or an optical sensor. In a case of use of the magnetic sensors, they are installed on the slidable lever 13 instead of the movable contacts 15. Magnetic members are used in place of the stationary contacts 16 to produce changes in outputs of the magnetic sensors when facing the magnetic members. In a case of use of the optical sensors, they are installed on the slidable lever 13 instead of the movable contacts 15. Slits are formed in areas to which the stationary contacts 16 are affixed to produce changes in outputs of the optical sensors when facing the slits. Use of such a non-contact type sensor offers the advantage in that the durability of the shift lever position sensor 12 is improved.

The invention may be used with less than four- or more than five-speed automatic transmissions.

The shift lever position sensor 12, as used in the above embodiments, is designed to detect the position of the gear shift lever 11 as selected by the vehicle operator, however, a gear range sensor may alternatively be used which works to detect in which of the gear ranges the automatic transmission is placed.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. An automatic transmission control system comprising:
a lever position sensor designed to produce signals each of which represents one of a parking position, a reverse position, a neutral position, and a drive position to which a gear shift lever is shifted manually by an operator;
a plurality of hydraulic control valves working to control hydraulic pressures to be supplied to frictional elements of an automatic transmission;
a manual selector valve which selectively establishes hydraulic supply circuits leading to said hydraulic control valves following a shifting motion of the gear shift lever, said manual selector valve working to establish predetermined ones of the hydraulic supply circuit to achieve a selected one of forward gears of the automatic transmission only when the gear shift lever is placed in the drive position; and
a gear change controller which monitors a position of the gear shift lever using the signal produced by said lever position sensor and operates said hydraulic control valves to hydraulically control engagement of the frictional elements of the automatic transmission to establish a selected one of gears of the automatic transmission, when the signal from said lever position sensor represents the position of the gear shift lever other than the drive position, and a predetermined condition is encountered, said gear change controller deeming the gear shift lever to be placed in the drive position and performing a deemed D-position hydraulic transmission control to establish a given one of the forward gears of the automatic transmission.

2. An automatic transmission control system as set forth in claim 1, wherein each of a given number of the signals produced by said lever position sensor carries a binary code made of a combination of a plurality of binary signals, each of the binary codes representing one of the parking, reverse, neutral, and drive position, and intermediate positions therebetween to which the gear shift lever is shiftable, and wherein two of the combinations of the binary signals representing adjacent two of the parking, reverse, neutral, drive, and intermediate positions are different from each other in a binary value of only one of the binary signals.

3. An automatic transmission control system as set forth in claim 2, at least one of the binary signals is an active level signal when the gear shift lever is placed in any of the parking, reverse, neutral, drive, and intermediate positions.

4. An automatic transmission control system as set forth in claim 2, wherein each of a given number of the signals produced by said lever position sensor carries a three-bit code made of a combination of a plurality of binary signals, each of the three-bit codes representing one of the parking, reverse, neutral, and drive position, and intermediate positions therebetween to which the gear shift lever is shiftable, and wherein two of the binary signals of the three-bit code representing each of the intermediate positions are in an active level.

5. An automatic transmission control system as set forth in claim 1, wherein each of the signals produced by said lever position sensor carries a code made up of binary values, all of the binary values are active level values when the gear shift lever is placed in the drive position.

6. An automatic transmission control system as set forth in claim 1, further comprising a failure determining circuit working to monitor a failure in operation of said lever position sensor, and wherein each of the signals produced by said lever position sensor carries a binary code made up of a combination of binary values, each time any one of the binary codes changes in the binary value, said failure determining circuit determines whether or not the position of the gear shift lever represented by a resulting combination of the binary values is adjacent to that represented by a combination of the binary values group before the any one of the binary codes changes to determine whether said lever position sensor is failing in operation or not.

7. An automatic transmission control system as set forth in claim 2, wherein the deemed D-position hydraulic transmission control is performed when the gear shift lever is monitored as being placed in an R-N position intermediate between the reverse and neutral positions.

8. An automatic transmission control system as set forth in claim 1, wherein the deemed D-position hydraulic transmission control is performed when the gear shift lever is monitored as being kept in an N-D position intermediate between the neutral and drive positions for a given period of time.

9. An automatic transmission control system as set forth in claim 1, wherein the deemed D-position hydraulic transmission control is performed immediately when the gear shift lever is monitored as being shifted from the drive position to an N-D position intermediate between the drive and neutral positions, and wherein the deemed D-position hydraulic transmission control is performed when the gear shift lever is monitored as being shifted from the neutral position to and kept in the N-D position for a given period of time.

10. An automatic transmission control system as set forth in claim 7, further comprising an input shaft speed sensor which measures a speed of an input shaft of the automatic transmission and provides a signal indicative thereof, and wherein said gear change controller monitors a gear change action of the automatic transmission using the signal provided by said input shaft speed sensor during execution of the deemed D-position hydraulic transmission control to determine whether said lever position sensor is failing in operation or not.

11. An automatic transmission control system as set forth in claim 7, wherein said gear change controller works to determine a gear ratio of the automatic transmission, and wherein said gear change controller monitors a gear change action of the automatic transmission using the determined gear ratio during execution of the deemed D-position hydraulic transmission control to determine whether said lever position sensor is failing in operation or not.

12. An automatic transmission control system as set forth in claim 7, wherein said gear change controller works to determine the hydraulic pressures acting on the frictional elements of the automatic transmission, and wherein said gear change controller monitors a gear change action of the automatic transmission using the determined hydraulic pressures during execution of the deemed D-position hydraulic transmission control to determine whether said lever position sensor is failing in operation or not.

13. An automatic transmission control system as set forth in claim 6, wherein when it is determined that the lever position sensor is failing, said gear change controller performs a fail-safe function to control the hydraulic control valves so as to establish a given gear in a drive range of the automatic transmission.

14. An automatic transmission control system as set forth in claim 10, wherein when it is determined that the lever position sensor is failing, said gear change controller performs a fail-safe function to control the hydraulic control valves so as to establish a given gear in a drive range of the automatic transmission.

* * * * *